(12) United States Patent
Randall

(10) Patent No.: US 7,982,436 B2
(45) Date of Patent: Jul. 19, 2011

(54) BATTERY COVER WITH CONTACT-TYPE POWER RECEIVER FOR ELECTRICALLY POWERED DEVICE

(75) Inventor: Mitch Randall, Longmont, CO (US)

(73) Assignee: Pure Energy Solutions, Inc., Boulder, CO (US)

( * ) Notice: Subject to any disclaimer, the term of this patent is extended or adjusted under 35 U.S.C. 154(b) by 1107 days.

(21) Appl. No.: 11/672,010

(22) Filed: Feb. 6, 2007

(65) Prior Publication Data

US 2007/0194526 A1    Aug. 23, 2007

Related U.S. Application Data

(63) Continuation-in-part of application No. 10/732,103, filed on Dec. 10, 2003, now Pat. No. 7,172,196.

(60) Provisional application No. 60/432,072, filed on Dec. 10, 2002, provisional application No. 60/441,794, filed on Jan. 22, 2003, provisional application No. 60/444,826, filed on Feb. 4, 2003, provisional application No. 60/776,332, filed on Feb. 24, 2006, provisional application No. 60/778,761, filed on Mar. 3, 2006, provisional application No. 60/781,456, filed on Mar. 10, 2006, provisional application No. 60/797,140, filed on May 3, 2006.

(51) Int. Cl.
    *H02J 7/00* (2006.01)
(52) U.S. Cl. ................ 320/137; 320/113; 320/115
(58) Field of Classification Search .......... 320/114, 320/115, 137; 455/572, 573
    See application file for complete search history.

(56) References Cited

U.S. PATENT DOCUMENTS

| | | | |
|---|---|---|---|
| 3,205,618 A | 9/1965 | Heytow | |
| 3,522,474 A | 8/1970 | Piel | |
| 4,213,078 A * | 7/1980 | Ferrell et al. | 320/107 |
| 4,402,151 A | 9/1983 | Meadow | |
| 4,616,832 A | 10/1986 | Groner | |
| 4,709,202 A | 11/1987 | Koenck et al. | |
| 5,175,409 A | 12/1992 | Kent | |
| 5,220,521 A | 6/1993 | Kikinis | |
| 5,254,931 A * | 10/1993 | Martensson | 320/114 |
| 5,527,637 A | 6/1996 | Nakazawa et al. | |
| 5,594,314 A | 1/1997 | Hagiuda et al. | |
| 5,793,123 A | 8/1998 | Ho et al. | |
| 5,868,076 A | 2/1999 | Myus et al. | |
| 5,890,717 A | 4/1999 | Rosewarne et al. | |
| 5,999,410 A | 12/1999 | Weiler | |
| 6,023,147 A | 2/2000 | Cargin et al. | |
| 6,037,750 A | 3/2000 | Von Novak | |
| 6,044,767 A | 4/2000 | Myus et al. | |

(Continued)

OTHER PUBLICATIONS

Non-Final Office Action mailed May 26, 2010, in U.S. Appl. No. 11/682,309, filed Mar. 5, 2007.

(Continued)

*Primary Examiner* — Edward Tso
*Assistant Examiner* — Arun Williams
(74) *Attorney, Agent, or Firm* — James R. Young; Cochran Freund & Young LLC

(57) ABSTRACT

An electronic system includes a power delivery support structure having a power delivery surface with first and second conductive regions. An electronic device includes a plurality of contacts arranged so at least one of them engages the first conductive region and at least another of them engages the second conductive region independently of the orientation of the device relative to the power delivery surface.

5 Claims, 16 Drawing Sheets

U.S. PATENT DOCUMENTS

| | | |
|---|---|---|
| 6,326,767 B1 | 12/2001 | Small et al. |
| 6,384,570 B2 | 5/2002 | Matsuyama |
| 6,459,175 B1 | 10/2002 | Potega |
| 6,509,717 B2 | 1/2003 | Lee |
| 6,768,288 B2 | 7/2004 | Rosenquist et al. |
| 6,824,281 B2 | 11/2004 | Schofield et al. |
| 6,851,961 B2 | 2/2005 | Lin |
| 6,913,477 B2 | 7/2005 | Dayan et al. |
| 7,172,196 B2 | 2/2007 | Randall |
| 7,176,655 B2 | 2/2007 | Kogan et al. |
| 7,375,609 B2* | 5/2008 | Suzuki et al. ............... 336/200 |
| 7,392,068 B2 | 6/2008 | Dayan et al. |
| 7,399,202 B2 | 7/2008 | Dayan et al. |
| 7,474,875 B1 | 1/2009 | Dayan et al. |
| 7,495,414 B2 | 2/2009 | Hui |
| 2002/0153863 A1* | 10/2002 | Arndt ............... 320/115 |
| 2002/0158962 A1* | 10/2002 | Ishikawa ............... 347/215 |
| 2003/0210106 A1 | 11/2003 | Cheng et al. |
| 2004/0048511 A1 | 3/2004 | Dayan et al. |
| 2004/0082369 A1 | 4/2004 | Dayan et al. |
| 2004/0131928 A1 | 7/2004 | Dayan et al. |
| 2004/0195767 A1 | 10/2004 | Randall |
| 2005/0139383 A1 | 6/2005 | Kent et al. |
| 2005/0189910 A1* | 9/2005 | Hui ............... 320/108 |
| 2005/0208817 A1 | 9/2005 | Dayan et al. |
| 2006/0076922 A1* | 4/2006 | Cheng et al. ............... 320/108 |
| 2006/0176660 A1 | 8/2006 | Amiri |
| 2006/0205381 A1 | 9/2006 | Beart et al. |
| 2007/0126393 A1 | 6/2007 | Bersenev |
| 2007/0182367 A1 | 8/2007 | Partovi |
| 2007/0247883 A1 | 10/2007 | Belyanin |
| 2007/0279002 A1 | 12/2007 | Partovi |
| 2009/0015075 A1 | 1/2009 | Cook et al. |
| 2009/0033280 A1 | 2/2009 | Choi et al. |
| 2009/0072628 A1 | 3/2009 | Cook et al. |
| 2009/0096413 A1 | 4/2009 | Partovi et al. |
| 2009/0098750 A1 | 4/2009 | Randall |
| 2009/0102416 A1 | 4/2009 | Burley |
| 2009/0278494 A1 | 11/2009 | Randall |

OTHER PUBLICATIONS

Non-Final Office Action mailed Nov. 5, 2009, in U.S. Appl. No. 11/800,427, filed May 3, 2007.

Non-Final Office Action mailed Jul. 21, 2010, in U.S. Appl. No. 12/348,881, filed Jan. 5, 2009.

International Search Report for PCT/US08/55944, ISA/US, Jun. 9, 2009.

International Search Report for PCT/US08/062717, ISA/US, Aug. 18, 2008.

International Search Report for PCT/US09/30161, ISA/US, May 12, 2009.

* cited by examiner

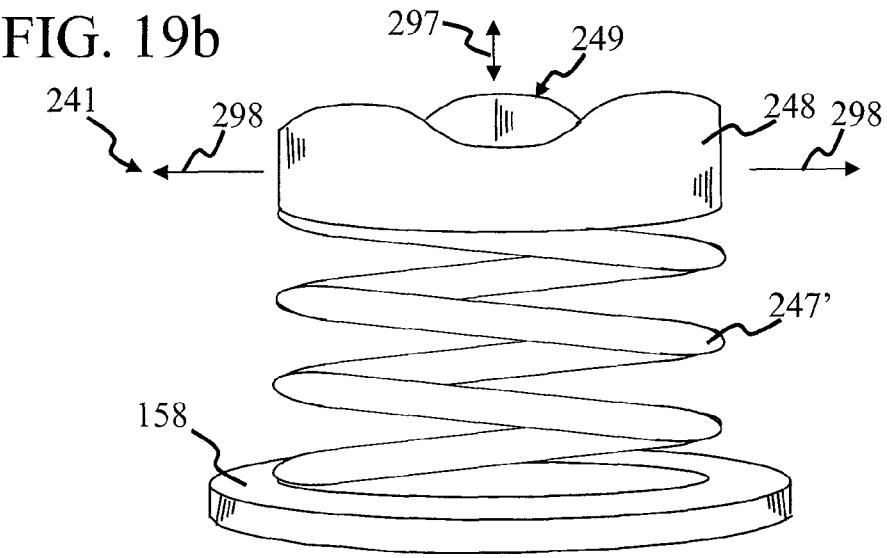
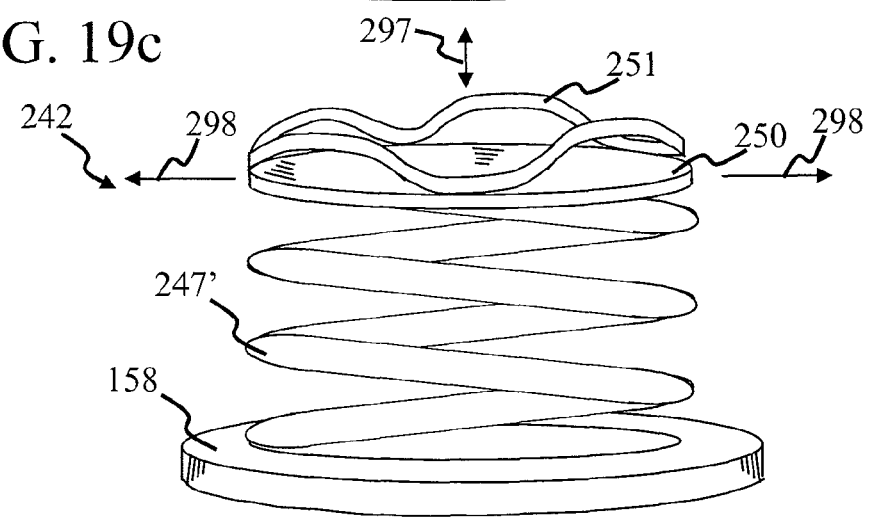
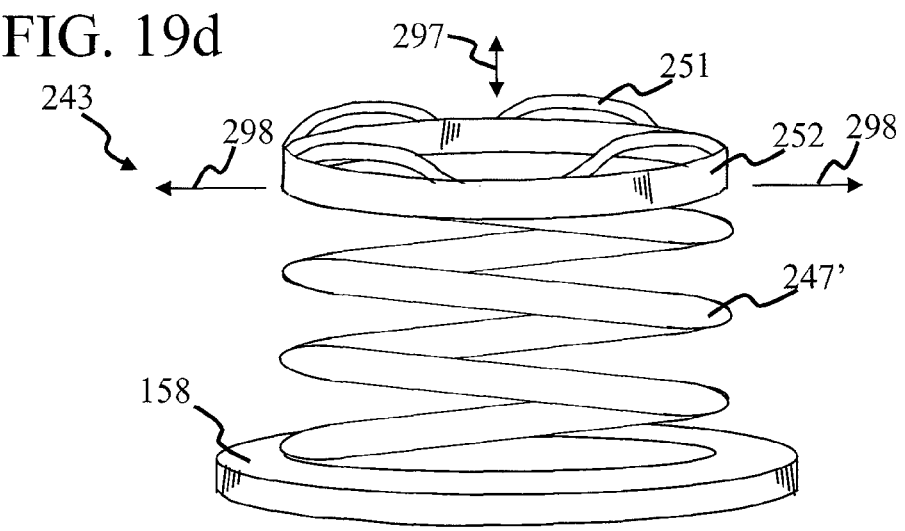

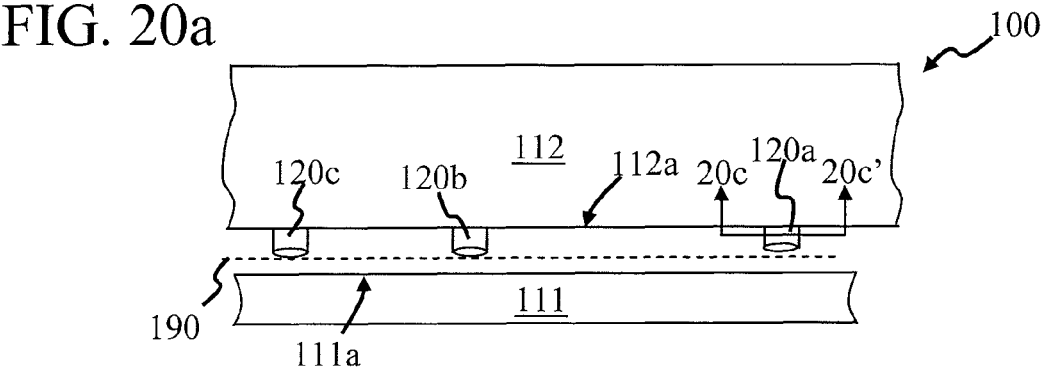
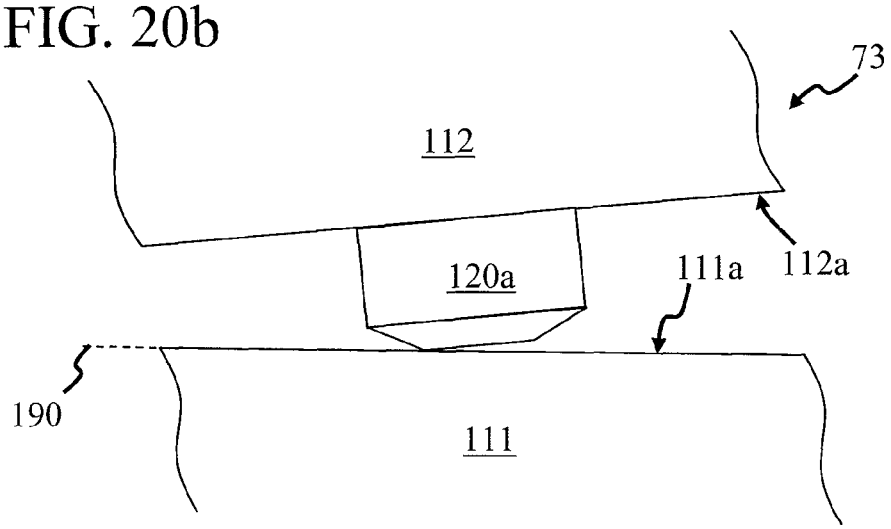
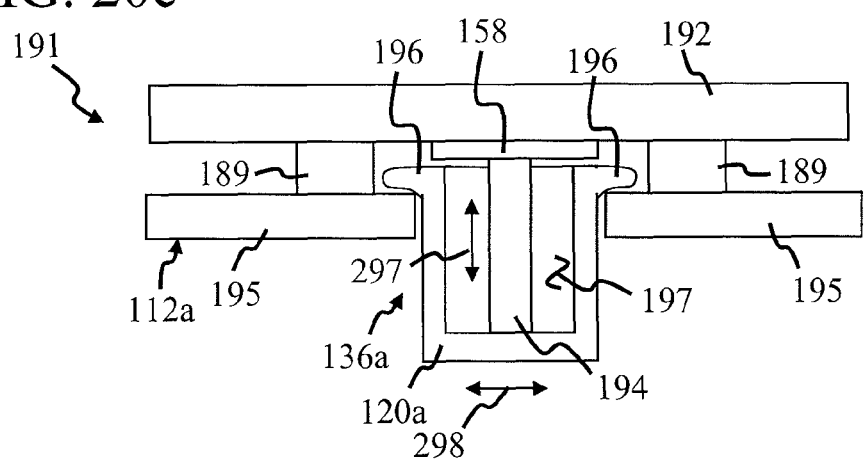

BATTERY COVER WITH CONTACT-TYPE POWER RECEIVER FOR ELECTRICALLY POWERED DEVICE

CROSS-REFERENCES TO RELATED APPLICATIONS

The present application is a continuation-in-part of U.S. patent application Ser. No. 10/732,103 filed on Dec. 10, 2003, which claims the benefit of U.S. Provisional Application Ser. Nos. 60/432,072, 60/441,794 and 60/444,826, filed on Dec. 10, 2002, Jan. 22, 2003 and Feb. 4, 2003, respectively, all of which are incorporated herein by reference. The present application also claims priority to U.S. Provisional Application Ser. Nos. 60/776,332, 60/778,761, 60/781,456 and 60/797,140 filed on Feb. 24, 2006, Mar. 3, 2006, Mar. 10, 2006 and May 3, 2006, respectively, all of which are incorporated herein by reference.

BACKGROUND OF THE INVENTION

1. Field of the Invention

The present invention relates to electronic systems and methods for providing electrical power to one or more electronic devices through a power delivery surface.

2. Description of the Related Art

A variety of mobile electronic devices, such as toys, game devices, cell phones, laptop computers, cameras and personal digital assistants, have been developed along with ways for powering them. These devices typically include a battery which is rechargeable by connecting it to a power source, such as an electrical outlet, through a power cord unit. In a typical set-up, the power cord unit includes an outlet connector for connecting it to the electrical outlet and a battery connector for connecting it to a corresponding battery power receptacle. The outlet and battery connectors are in communication with each other so electrical signals can flow between them. In some setups, the power cord unit also includes a power adapter connected to the outlet and battery connectors through AC input and DC output cords, respectively, so it operates as a power adapter.

Manufacturers, however, generally make their own model of electronic device and do not make their power cord unit compatible with the electronic devices of other manufacturers or with other types of electronic devices. As a result, a battery connector made by one manufacturer will typically not fit into the battery power receptacle made by another manufacturer. Further, a battery connector made for one type of device typically will not fit into the battery power receptacle made for another type of device. Manufacturers do this for several reasons, such as cost, liability concerns, different power requirements, and to acquire a larger market share.

This can be a problem for the consumer because he or she has to buy a compatible power cord unit for their particular electronic device. Since people tend to switch devices often, it is inconvenient and expensive for them to also have to switch power cord units. Further, power cord units that are no longer useful are often discarded which leads to waste. Also, people generally own a number of different types of electronic devices and owning a power cord unit for each one is inconvenient. Consequently, there is a need for an electronic system that provides power to one or more different electronic devices.

BRIEF SUMMARY OF THE INVENTION

The present invention employs an electronic system having a power delivery support structure with a power delivery surface. The power delivery surface is defined by separate conductive regions which can provide a potential difference between them. The invention also employs an electronic device having a plurality of contacts arranged so at least one of them engages one of the conductive regions and another of them engages another of the conductive regions when the electronic device is carried by the power delivery support structure. The power delivery surface and contacts are arranged so the potential difference is provided to the contacts independently of the orientation of the electronic device relative to the power delivery surface. The electronic device includes and carries a circuit which receives the potential difference from the contacts, rectifies it and provides a desired potential difference which is used to power the electronic device.

These and other features, aspects and advantages of the present invention will become better understood with reference to the following drawings, description and claims.

BRIEF DESCRIPTION OF THE DRAWINGS

FIG. 7b is a schematic diagram of an electronic circuit, which includes the capacitances between electrodes separated by the covering of FIG. 7a.

FIGS. 19a, 19b, 19c, 19d, 19e and 19f are perspective views of different embodiments of moveable contacts, in accordance with the invention.

FIG. 20a is a side view of an electronic device with contacts disengaged from a power delivery surface.

FIG. 20b is a side view of the electronic device of FIG. 20a with a contact partially engaged with the power delivery surface.

FIG. 20c is a side view of the contact system of FIG. 20a taken along a cut-line 20c-20c', in which the contacts are moveable, in accordance with the invention.

FIG. 20e is a side view of another embodiment of a contact system taken along cut-line 20c-20c' of FIG. 20a.

DETAILED DESCRIPTION OF THE INVENTION

Figure 1:
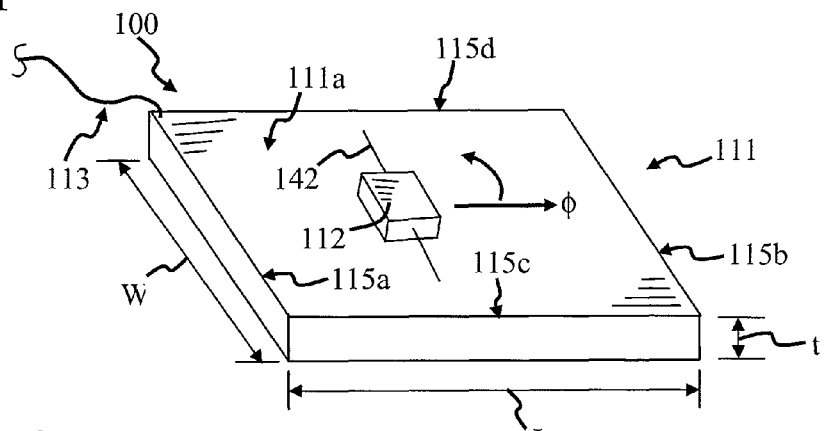
FIG. 1 is a perspective view of an electronic system with a power delivery surface for providing power to an electronic device, in accordance with the invention.

FIG. 1 is a perspective view of a power delivery system 100, in accordance with the invention, for providing power to an electrical or electronic device 112 with a power delivery surface 111a. Power delivery system 100 can power more than one electronic device made by the same or different manufacturers. It can also power different types of electronic devices. This reduces the need for the consumer to have a power cord unit for each electronic device they use. Electronic device 112 can be of many different types, such as a toys, game devices, cell phone, laptop computer, camera, personal digital assistant, etc. Most of these devices are mobile and powered by a rechargeable battery. However, the invention is also applicable to electronic devices, such as a desktop computer, that are not generally considered to be mobile.

System 100 includes a power delivery support structure 111 connected to a power source (not shown) through a power cord unit 113. The power source can be of many different types, such as an electrical outlet or battery, and provides a potential difference through unit 113 to separate conductive regions in structure 111. The potential difference is provided to electronic device 112 in response to device 112 being carried by structure 111 on surface 111a. In this way, surface 111a operates to deliver power to electronic device 112.

Electronic device 112 can be powered in many different ways by the power delivery surface. For example, surface 111a can provide charge to a battery included in device 112, which is often the case for mobile devices. Device 112 can also be powered directly by surface 111a. This is useful in situations where device 112 is not battery operated or it is desirable to operate device 112 with its battery removed. An example of this is when using a laptop computer, which can operate if power is provided to it by surface 111a after its battery has been removed.

Power delivery support structure 111 can include many different materials, but it preferably includes an insulative material with separate conductive regions which define at least a portion of surface 111a. As discussed in more detail below, the conductive regions are separate so they provide the potential difference to electronic device 112.

In this embodiment, electronic device 112 includes and carries contacts and an electronic circuit which are in communication with each other. In operation, the circuit receives the potential difference from the power delivery surface through the contacts when they engage surface 111a. The potential difference is rectified by the electronic circuit to provide a desired voltage potential which is used to power electronic device 112. It is advantageous that the circuit be carried by device 112 so it can be designed to receive the potential difference from the power delivery surface and provide device 112 with the desired voltage potential.

This feature is useful because sometimes it is desirable to power multiple electronic devices with the power delivery surface. These devices may operate in response to different ranges of voltage potentials. In some situations, the electronic devices are the same type of device (i.e. two cell phones). The electronic devices can be the same models and have the same voltage requirements or they can be different models and have different voltage requirements. The different models can be made by the same or different manufacturers. In other situations the electronic devices are different types of devices (i.e. a cell phone and laptop computer). Different types of devices generally require different ranges of voltage potentials, although they can be the same in some examples. The different types of devices can be made by the same or different manufacturers. Hence, the electronic circuit for each device is designed so the power delivery surface can provide power to multiple electronic devices having many different voltage requirements.

In accordance with the invention, the contacts are arranged so the potential difference is provided to the electronic circuit independently of the orientation of device 112 on power delivery surface 111a. In other words, the potential difference is provided to the electronic circuit for all angles φ. This feature is advantageous for several reasons. For example, the contacts can engage surface 111a without the need to align them with it, so at least two contacts are at different potentials. In this example, angle φ corresponds to the angle between a side of structure 111 and a reference line 142 extending through device 112 and parallel to surface 112a. It should be noted, however, that another reference can be used. Here, angle φ has values between about 0° and 360°.

This feature is also advantageous when powering multiple electronic devices because they can be arranged in many more different ways on surface 111a. This allows surface 111a to be used more efficiently so more devices can be carried on and charged by the power delivery surface. This is useful in situations where there are not enough electrical outlets available to charge the multiple electronic devices individually. In general, structure 111 can carry more electronic devices when length L and/or width W are increased and fewer when length L and/or width W are decreased. The number of devices that structure 111 can carry also depends on their size. For example, cell phones are typically smaller than laptop computers.

Power delivery support structure 111 can have many different shapes, but here it is shown with surface 111a being rectangular so structure 111 defines a cubic volume. Surface 111a is shown as being substantially flat and the separate conductive regions define continuous surfaces separated from each other by an insulative material region. Surface 111a extends between opposed sides 115a and 115b, as well as opposed sides 115c and 115d. Opposed sides 115c and 115d extend from opposite ends of sides 115a and 115b and between them. Sides 115a and 115b are oriented at non-zero angles relative to sides 115c and 115d. In this particular example, the non-zero angle is about 90° since surface 111a is rectangular. In other examples, surface 111a can be curved, triangular, etc. When surface 111a is circular, structure 111 defines a cylindrical volume.

Electronic system 100 has many different embodiments that provide the features and advantages discussed above and others. Several embodiments are discussed in co-pending U.S. patent application Ser. No. 10/732,103. Several more embodiments will be discussed presently.

Figure 2:
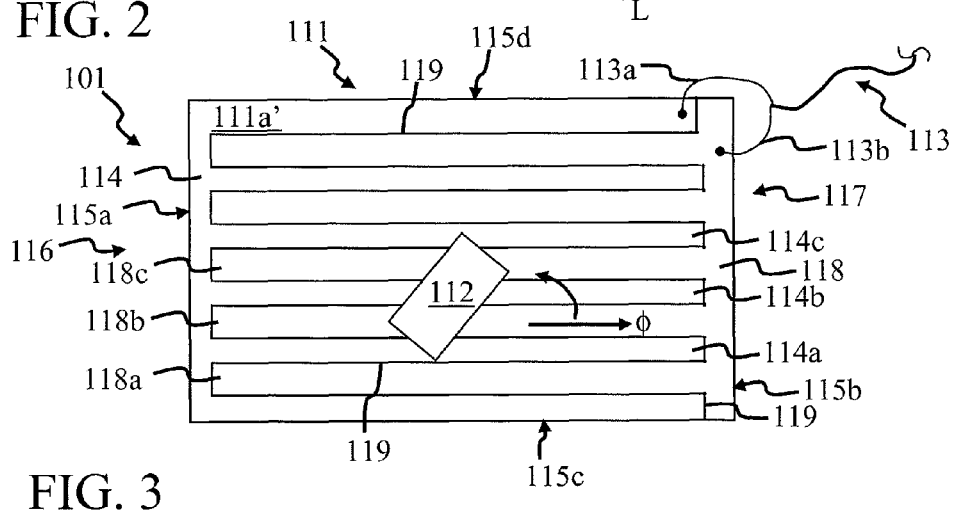
FIG. 2 is a top view of another embodiment of an electronic system with a power delivery surface for providing power to an electronic device.

FIG. 2 is a top view of an electronic system, embodied as a power delivery system 101, for providing power with a power delivery surface to electronic device 112. System 101 is similar to system 100 and includes power delivery support structure 111 and power cord unit 113. In this embodiment, the power delivery surface, denoted as surface 111a', includes two separate conductive regions, denoted as regions 116 and 117. Regions 116 and 117 are separated from each other by an insulative region 119 (FIGS. 5a and 5b) and define separate continuous surfaces.

Region 119 provides electrical isolation between conductive regions 116 and 117 so a potential difference can be provided between them. If a current flows between conductive regions 116 and 117, it also flows through the electronic circuit carried by electronic device 112 when the contacts engage surface 111a'. In this way, power is provided to device 112 when it is carried by power delivery support structure 111. If a current flows between regions 116 and 117 without flowing through the electronic circuit, then it is typically an undesirable leakage current. In general, as the separation between regions 116 and 117 increases, the leakage current decreases. Similarly, as the separation between regions 116 and 117 decreases, the leakage current increases. The leakage current also depends on the material included in insulative region 119.

In this embodiment, conductive region 116 includes a base contact 114 which extends along side 115a and between sides 115c and 115d. Region 116 also includes a first plurality of contact pads, some of which are denoted as contact pads 114a, 114b and 114c. These contact pads are connected to base contact 114 and extend outwardly from it and towards side 115b. Conductive region 117 includes a base contact 118 which extends along side 115b and between sides 115c and 115d. Region 117 also includes a second plurality of contact pads, some of which are denoted as contact pads 118a, 118b and 118c. These contact pads are connected to base contact 118 and extend outwardly from it and towards side 115a. It should be noted that contacts 114 and 118 extend all the way between sides 115c and 115d. However, in other embodiments, they can extend partially between sides 115c and 115d. It should also be noted that base contacts 114 and 118 are shown as being rectangular in this example, but they can have other shapes, such as curved or triangular, in others.

In this example, contact pads 114a-114c and 118a-118c extend parallel to each other and are interleaved so contact pad 114a is positioned between contact pad 118a and 118b, and contact pad 114b is positioned between contact pads 118b and 118c. As shown in FIG. 2, the other contact pads in regions 116 and 117 are interleaved in the same manner. It should be noted that in some examples, the different contact pads in regions 117 and 118 can be connected together with vias.

Power cord unit 113 includes conductive lines 113a and 113b which are connected to conductive regions 116 and 117, respectively. In one mode of operation, the power supply provides conductive regions 116 and 117 with different voltage potentials through corresponding conductive lines 113a and 113b. In this mode, there is a potential difference between regions 116 and 117, and device 112 is provided with power in response to it, when device 112 is carried on surface 111a' and the contacts engage surface 111a'. In this way, surface 111a' is arranged so a potential difference is provided between at least two of the contacts carried by device 112.

It should be noted that more than two potentials can be provided to surface 111a' by power cord unit 113 and the use of two here is for illustrative purposes. For example, power cord unit 113 can include three conductive lines which provide positive, negative, and zero potentials to a corresponding number of conductive regions the same or similar to regions 116 and 117.

Figure 3:
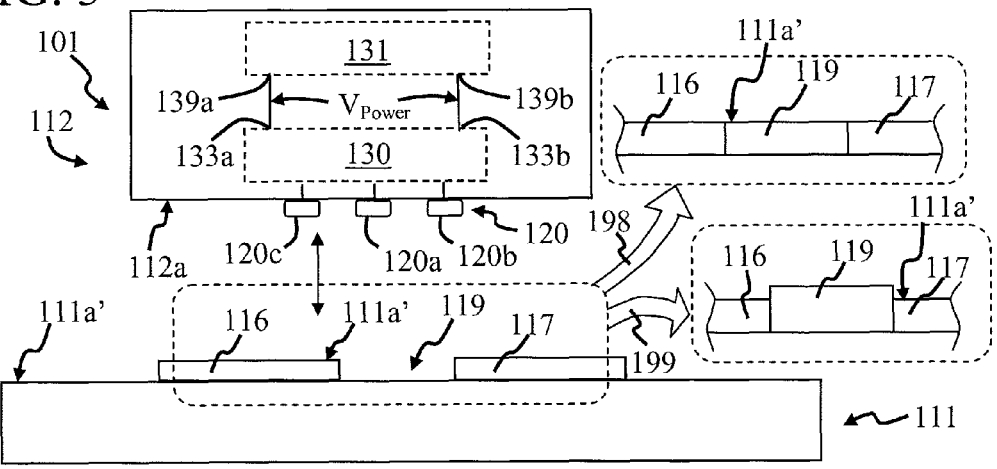
FIG. 3 is a side view of the electronic system of FIG. 2.
Figure 10A:
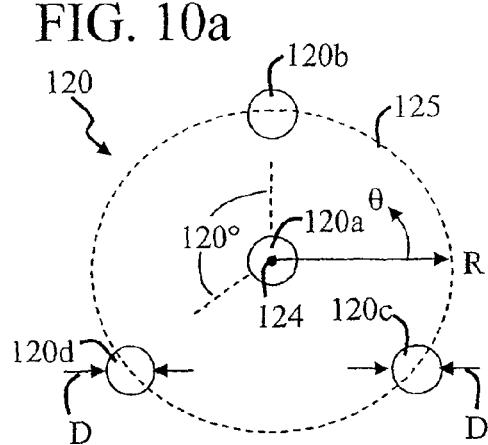
FIG. 10a is a top view showing one arrangement of four contacts included in the cell phone of FIGS. 9a and 9b.

FIG. 3 is a side view of power delivery system 101 with electronic device 112 positioned above power delivery support structure 111. In accordance with the invention, electronic device 112 includes and carries a plurality of contacts 120 which extend through its surface 112a. In this example, contacts 120 include four contacts, which are denoted as contacts 120a, 120b, 120c and 120d (FIG. 10a).

In accordance with the invention, electronic device 112 also includes and carries a circuit 130 which is in communication with contacts 120. Contacts 120 are arranged so there is a potential difference between at least two of them when they engage surface 111a'. Contacts 120 are also arranged so the potential difference is provided to the electronic circuit independently of the orientation of device 112 on surface 111a'. This potential difference is provided to circuit 130 and rectified to provide a rectified voltage signal $V_{Power}$ between conductive contacts 133a and 133b. In this way, the power delivery surface provides the potential difference to circuit 130 through electrical contacts 120 when contacts 120 engage it.

Conductive contacts 133a and 133b (FIGS. 4, 9b, 13b, 15c, etc.) are connected to contacts 139a and 139b (FIGS. 15b, 15d, 15e, 15f, etc.), respectively, of a power system 131. Power system 131 generally includes a rechargeable battery which is charged in response to receiving signal $V_{Power}$. System 131 powers electronic device 112 when contacts 120 are disengaged from surface 111a'. In the following discussion, conductive contacts 133a and 133b are sometimes referred to generally as conductive contacts 133 and contacts 139a and 139b are sometimes referred to generally as contacts 139.

In this embodiment, insulative region 119 is a gap which extends through surface 111a' so regions 116 and 117 are spaced apart from each other. However, in other examples, region 119 can include an insulative material, such as rubber, plastic, silicone or another dielectric material, which extends upwardly so it separates regions 116 and 117.

One example is shown by substitution arrow 198 where region 119 includes an insulative material extending upwardly between regions 116 and 117 so it is level with them. Region 119 can also be above or below their level in other examples. This is shown by substitution arrow 199 where region 119 extends upwardly between regions 116 and 117 so it extends above their level. In some examples, the upper surface of region 119 can be tapered so contacts 120 can easily slide across surface 111a'. The ease with which contacts 120 slide across surface 111a' depends on the shapes of contacts 120. Different shapes for contacts 120 are discussed with FIGS. 12a and 12b.

It should be noted that power delivery surface 111a' is defined by regions 116, 117 and 119 and that regions 116, 117 and 119 are typically much thinner than thickness t (FIG. 1). In this way, surface 111a' appears to be substantially flat. In one particular example, thickness t is about two-tenths of a millimeter to five millimeters or more and regions 116, 117 and 119 each have thicknesses less than about two-tenths of a millimeter. In other examples, however, thickness t and the thicknesses of regions 116, 117 and 119 can have values outside of these ranges. In FIG. 3, region 119 is an air-gap between regions 116 and 117 so it has a material thickness of zero millimeters.

Figure 4:
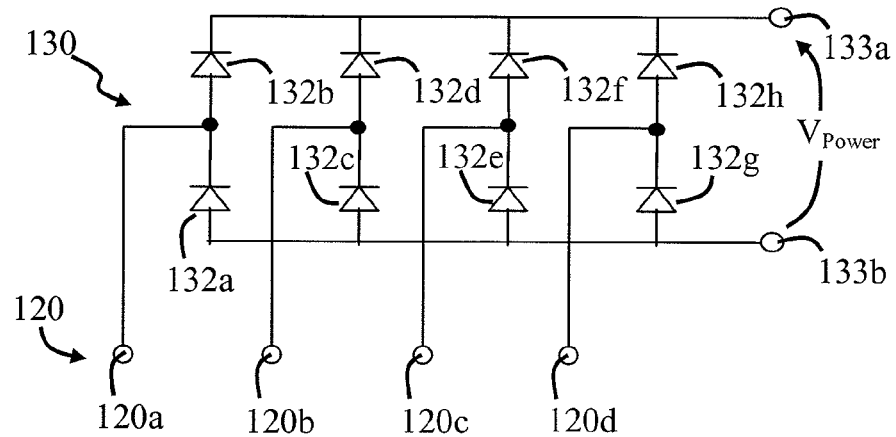
FIG. 4 is a schematic diagram of one embodiment of an electronic circuit which rectifies the potential difference provided by a power delivery surface.

FIG. 4 is a schematic diagram of one embodiment of circuit 130, in accordance with the invention. In this example, circuit 130 includes contact 120a connected to an n-type side of a diode 132a and a p-type side of a diode 132b, contact 120b connected to an n-type side of a diode 132c and a p-type side of a diode 132d, contact 120c connected to an n-type side of a diode 132e and a p-type side of a diode 132f, and contact 120d connected to an n-type side of a diode 132g and a p-type side of a diode 132h. Diodes 132a, 132c, 132e and 132g each have corresponding p-type sides connected to conductive contact 133b and diodes 132b, 132d, 132f and 132h each have corresponding n-type sides connected to conductive contact 133a.

In this embodiment, circuit 130 operates as a bridge rectifier. It receives the potential difference from surface 111a' through contacts 120 and, in response, flows signal $V_{Power}$ between conductive contacts 133a and 133b. As mentioned above, contacts 120 are arranged so there is a potential difference between at least two of them when they engage surface 111a'. Circuit 130 provides the potential difference between any contacts in contacts 120 to conductive contacts 133a and 133b. The potential difference between contacts 133a and 133b is then provided to power system 131 through contacts 139a and 139b as signal $V_{Power}$. In this way, signal $V_{Power}$ is used as a source of power for power system 131. (Mention diode drop?)

Circuit 130 can change the potential difference received from surface 11a'. One way it can do this is by reducing it to a desired potential difference that is compatible with device 112. As discussed above, the desired potential difference is generally within a desired range of potential difference values which are compatible with device 112. The range of potential difference values depends on many different factors, such as power system 131 and the components included in circuit 130. It can also depend on the dimensions of contacts 120 and the material included in it.

For example, if electronic device 112 is a cell phone, it normally operates in a particular range of potential difference values, such as about five volts to seven volts. The particular range depends substantially on the manufacturer of the cell phone. As discussed above, one model of cell phone can operate in one range of potential difference values and another model can operate in a different range. In some instances, the ranges can overlap. If electronic device 112 includes a personal digital assistant or laptop computer, it generally operates in a range of potential difference values different from cell phones. This range can be between about fifteen volts to twenty-five volts, for example. Hence, electronic circuit 130 provides signal $V_{Power}$ to power system 131 so it is compatible with it.

"Contact probability" is the statistical probability that for a given position and orientation of the electrical device 112 in proximity with and relative to the power delivery surface 111a the system will allow for electrical power delivery to the electrical device 112. Contact probability is the probability that at least one contact 120 of the electromechanical device is in contact with a contact pad 114 at a first voltage level while a second contact 120 of the electromechanical device is simultaneously in contact with a contact pad 118 at a second voltage level such that power is delivered to the electrical device through the rectifier circuit. Contact probability is a function of the geometry of the contact pads 114, 118 of the power delivery surface 111a, the size of the gap G of the insulating region 119 separating pad 114 at the first voltage level and pad 118 at the second voltage level, and the arrangement of the plurality of contacts of the electromechanical device. It is desirable that the contacts 120 of the electronic device 112 achieve a 100% "contact probability" with the power delivery surface lila. Thus, the arrangement of the contact pads 114, 118 and insulation region 119 of the power delivery surface 111a combined with the arrangement of the contacts 120, should be chosen such that there is a 100% contact probability between the electrical device 112 and the power delivery surface 111a.

Figure 5A:
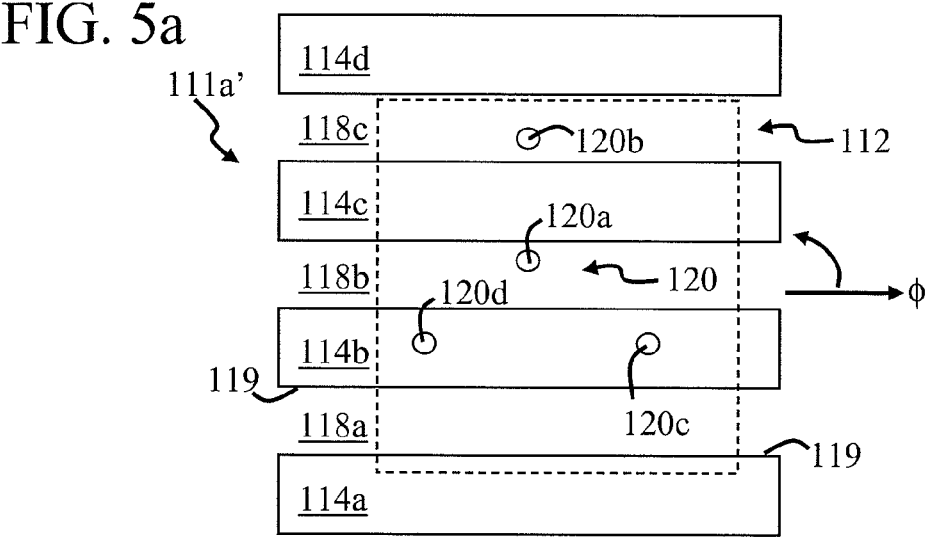
FIGS. 5a and 5b are more detailed top views of the electronic system of FIG. 2.

FIG. 5a is a more detailed top view of electronic device 112 being carried by power delivery support structure 111, with device 112 shown in phantom so contacts 120 can be seen. Here, contact 120a is engaged with contact pad 118b and contact 120b is engaged with contact pad 118c. Further, contacts 120c and 120d are engaged with contact pad 114b. Hence, there is not a potential difference between contacts 120c and 120d because they engage the same contact pad (i.e. contact pad 114b). However, there is a potential difference between contacts 120a and 120b relative to contacts 120c and 120d because they engage different conductive regions (i.e.

regions 116 and 117). In this way, contacts 120 are arranged so at least two of them are provided with a potential difference when they engage surface 111a'. It should be noted that this condition is still satisfied if device 112 is rotated by angle φ. The satisfaction of this condition is facilitated by choosing the dimensions of contacts 120 and regions 116, 117 and 119, as will be discussed presently.

Figure 5B:
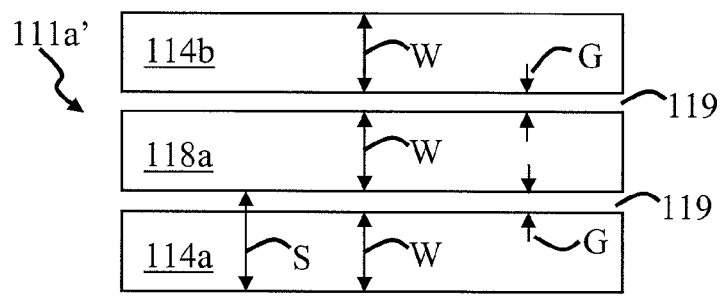

FIG. 5b is a more detailed top view of power delivery surface 111a' showing insulative region 119 in more detail. Here, each contact pad (i.e. 114a, 118a, 114b, 118b, etc.) has a width dimension W and insulative region 119 has a width dimension G. Hence, the contact pads included in regions 116 and 117 are spaced apart from each other by distance G. As discussed with FIG. 10a, contacts 120 are preferably cylindrical. The diameter of each contact is D and the distance between contact 120a and the other contacts is about R−D. The angle between contacts is 120°. Further, the distance between each adjacent contact pad in regions 116 and 117 is denoted as S, which is equal to about W+G.

For a four contact configuration as shown in FIGS. 5a and 10a, it is preferable that dimension R be less than or equal to dimension W (R≦W) so contact 120a and at least one other contact in contacts 120 are connected to the same contact pad in region 116 or 117. It is also preferable that the dimension R satisfy the following condition:

$$R \geq \frac{2}{3}(W + 2G) = \frac{2}{3}(S + G)$$

Dimension D can have many different values, but it is preferably chosen to be less than G so a contact in contacts 120 cannot connect regions 116 and 117 together. In this way, a contact in contacts 120 cannot engage regions 116 and 117 to form an undesirable low resistance connection between them (i.e. a short circuit). It is also preferable that dimension D be chosen to have a value that increases its durability, lifetime and current handling capability. To satisfy both of these conditions, it is preferred that dimension D be slightly smaller than dimension G. It is also preferred that dimension G be as large as possible. Dimension G is maximized, and all other constraints are met when G is adjusted such that:

$$R = W = \frac{2}{3}(W + 2G)$$

so $$W = 4G$$

or $$S = 5G$$

Also, $$D < G$$

In one example, given a grid spacing S, it was found that if G=0.2S, W=0.8S, R=0.8S and D<0.2S, then the above conditions are satisfied. However, these dimensions can have different values in other situations. If it is also assumed that the contact area of a contact 120 must be fully contacting a contact pad 114, 118. Thus, contacts 120 that are partially contacting an insulating region G 119, are not considered to be in contact. By requiring full contact between the contact 120 and the voltage pad 114, 118 on the power delivery surface 111a, the system ensures good, high quality electrical power delivery connections. To achieve 100% contact probability for the four contact system described above, the dimension R may satisfy the following condition:

$$R \leq W - D$$

and $$R \geq \frac{2}{3}(W + 2G + D)$$

As before, to further optimize the system it is assumed that diameter of the contact D be smaller than the widths of the insulating gap (D<G) such that the contacts cannot short circuit the adjacent pads of differing electrical potentials. It is also assumed that the diameter of the contacts should be as large as possible to maximize durability, contact lifetime, and current handling ability. Again this leads to the desire to have the contact diameter D slightly smaller than the insulating gap G. The contact diameter D may be expressed as a fraction K of the gap G:

$$D = KG$$

where $$K \leq 1$$

Substituting D=KG into the prior equations gives:

$$R \leq W - KG$$

and $$R \geq \frac{2}{3}(W + 2G + KG)$$

Combining equations gives:

$$W - KG = \frac{2}{3}(W + 2G + KG)$$

so $$W = (4 + 5K)G$$

or $$S = (5 + 5K)G$$

In summary, given a grid spacing S:

$$G = \frac{1}{5 + 5K}S$$

$$W = \frac{4 + 5K}{5 + 5K}S$$

$$R = 0.8S$$

$$D = \frac{K}{5 + 5K}S$$

For example, if K=0.9, then:
G=0.10526S
W=0.89472S
R=0.80000S
D=0.09474S

The following table lists coefficients of S for various other values of K.

| | K | | | | | |
|---|---|---|---|---|---|---|
| | 0 | 0.4 | 0.6 | 0.7 | 0.8 | 1.0 |
| G | 0.20000 | 0.14286 | 0.12500 | 0.11765 | 0.11111 | 0.1000 |
| W | 0.80000 | 0.85714 | 0.87500 | 0.88235 | 0.88889 | 0.9000 |
| R | 0.80000 | 0.80000 | 0.80000 | 0.80000 | 0.80000 | 0.8000 |
| D | 0.00000 | 0.05714 | 0.07500 | 0.08235 | 0.08889 | 0.1000 |

Two power delivery surfaces with different gap sizes but the same spacing S may be deployed. The power delivery surface with the larger gap size will typically be capable of delivering more power, but because may still retain the same or a compatible voltage standard as the power delivery source with the smaller gap size. The contact diameter D for the power delivery source with the large gap size will also be larger than the contact diameter D for the power delivery source with smaller gap sizes. If K and R remain fixed between the two systems a form of forward compatibility exists. In this scenario, the low power device will still achieve 100% connection probability on a power deliver surface with a larger gap. However, higher power devices will not be compatible with surfaces rated for lower power which might have a smaller gap size G. The larger diameter high power devices have larger contact diameters D, which may exceed the gap size of the low power delivery surface. Thus, the higher powered device may short across two adjacent power delivery source electrodes.

When the diameter D is 0.0, the solution to the above equations reduces to the first set of equations defining the dimensions of the four contact system shown in FIGS. 5a and 10a. For a diameter D of 0.0, the gap G may be as large as possible while maintaining 100% contact probability.

Figure 6A:
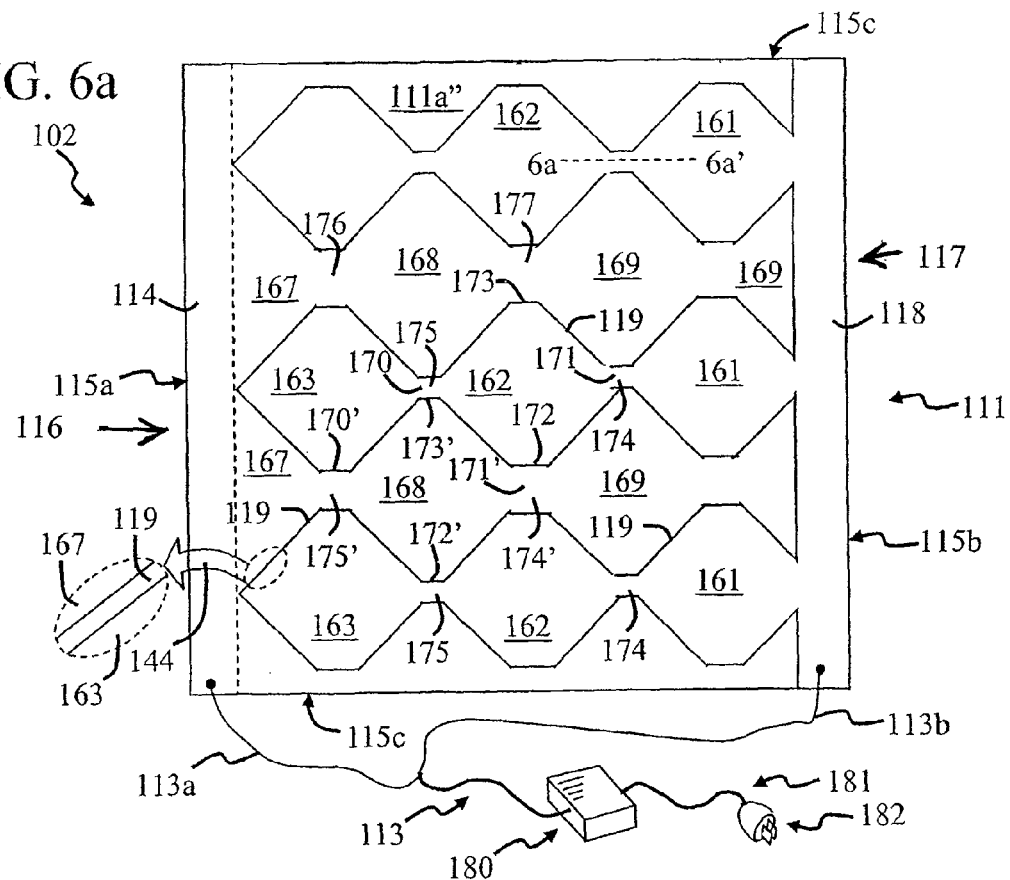
FIG. 6a is a top view of another embodiment of an electronic system with a power delivery surface for providing power to an electronic device.

FIG. 6a is a top view of an electronic system, embodied as a power delivery system 102, in accordance with the invention. System 102 is for providing power to electronic device 112 with a power delivery surface, denoted as surface 111a''. System 102 is similar to system 101 discussed above and includes power delivery support structure 111. It also includes conductive region 116 with base contact 114. Region 116 includes a first plurality of pad segments connected to contact 114, some of which are denoted as pad segments 167, 168 and 169. The first plurality of pad segments are connected to each other through separate conductive lines 176 and 177.

System 102 also includes region 117 with base contact 118. Region 117 includes a second plurality of pad segments connected to contact 118, some of which are denoted as pad segments 161, 162 and 163. The second plurality of pad segments are connected to each other through separate conductive lines 174 and 175. The first and second plurality of pad segments are separated from each other by insulative region 119, which is best seen in a blown up portion indicated by substitution arrow 144. Conductive regions 116 and 117 and insulative region 119 define surface 111a''. As discussed with FIGS. 6b-6d, conductive lines 174, 175, 174' and/or 174 can define a portion of surface 111a'' or they can be away from it.

It should be noted that base contacts 114 and 118 can have many different shapes, such as curved or triangular. In this example, however, they are shown as being rectangular in shape for simplicity. Pad segments 161, 162 and 163 are also rectangularly shaped and have first and second opposed portions and second and third opposed portions. For example, pad segment 162 has first and second opposed portions 170 and 171 and third and forth opposed portions 172 and 173. First portion 170 is connected to second portion 171 of adjacent pad segment 163 through conductive line 175 and second portion 171 is connected to first portion 170 of adjacent pad segment 161 through conductive line 174. Portion 170 of pad segment 163 is separated from base contact 114 by insulative region 119 and portion 171 of pad segment 161 is connected to base contact 118.

Similarly, pad segments 167, 168 and 169 are each rectangularly shaped and have first and second opposed portions and second and third opposed portions. For example, pad segment 168 has first and second opposed portions 170' and 171' and third and fourth opposed portions 172' and 173'. First portion 170' is connected to second portion 171' of adjacent pad segment 167 through a conductive line 175' and second portion 171' is connected to first portion 170' of adjacent pad segment 169 through a conductive line 174'. Pad segment 167 is connected to base contact 114.

Conductive lines 113a and 113b are connected to base contacts 114 and 118, respectively, at one end and to a power adapter 180 at their other ends. Conductive lines 113a and 113b are included in DC output cord 113. It should be noted, however, that conductive lines 113a and 113b can be connected to other portions of regions 116 and 117, respectively. Power adapter 180 is connected to an electrical plug 182 through an AC input cord 181. In operation, plug 182 is connected to an outlet so a potential difference is provided to power adapter 180 through cord 181. Power adapter 180 steps down this potential difference and provides it to conductive regions 116 and 117 through cord 113. In this way, a potential difference is provided to surface 111a'' so it operates as a power delivery surface.

Figure 6B:
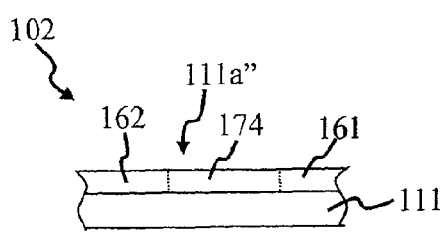
FIGS. 6b-6d are side views of the power delivery system of FIG. 6a, taken along a cut-line 6-6', and showing different embodiments of the power delivery surface, in accordance with the invention.
Figure 6C:
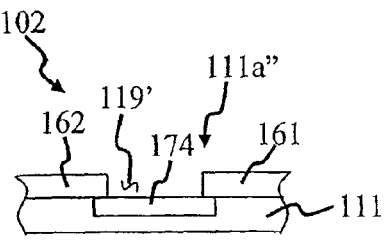
Figure 6D:
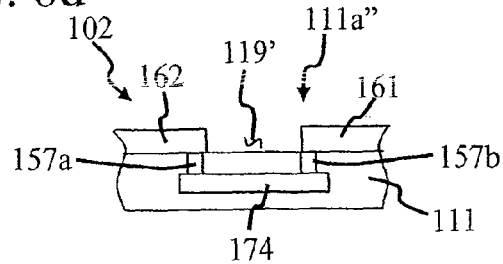

FIGS. 6b-6d are side views of power delivery system 102, taken along a cut-line 6-6', and show different embodiments of surface 111a'', in accordance with the invention. In FIG. 6b, pads 161 and 162 are connected together with conductive line 174. In this example, conductive line 174 and pads 161 and 162 are level with each other and define a portion of surface 111a. In FIG. 6b, pads 161 and 162 are connected together with conductive line 174. In this example, however, conductive line 174 and pads 161 and 162 are not level with each other. Instead, conductive line 174 is connected to pads 161 and 162 and extend through support structure 111 so there is a gap 119' between pads 161 and 162. Hence, pads 161 and 162 define a portion of power delivery surface 111a'' with conductive line 174 being adjacent to it. In FIG. 6c, conductive line 174 is connected to pads 161 and 162 through vias 157a and 157b, which extend downwardly through support structure 111 parallel with surface 111a''. Conductive line 174 extends through support structure 111 and is connected to vias 157a and 157b. Hence, pads 161 and 162 define a portion of power delivery surface 111a'' with conductive line 174 being away from it.

Power delivery system 100, and its various embodiments discussed in FIGS. 2 and 6a, can undesirably come into contact with other objects besides electronic devices. For example, a key, hand, pen, watch, jewelry or another conductive object can be positioned on the power delivery surface. Since some of these objects conduct current, they can affect the safety and performance of system 100. To reduce the likelihood of this occurring, a non-conductive covering can be positioned on the power delivery surface, as will be discussed presently.

Figure 7A:
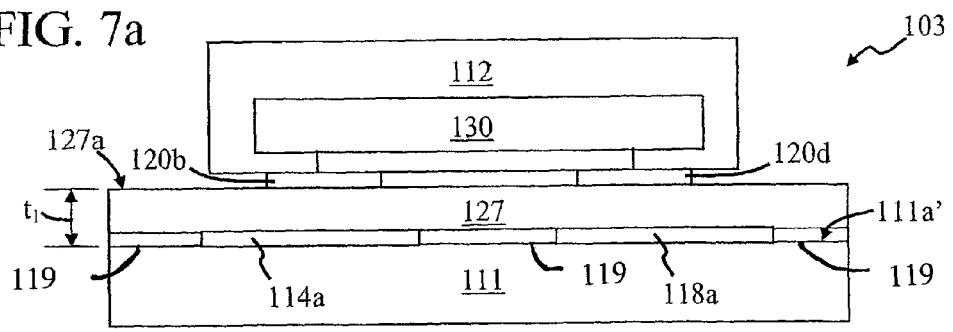
FIG. 7a is a side view of an electronic system having a covering on the power delivery surface.

FIG. 7a is a side view of a power delivery system 103, which can be similar to systems 100, 101 and 102 described above. However, in this embodiment, it is similar to power delivery system 101 for illustrative purposes. In FIG. 7a, only contact pads 114a and 118a and contacts 120b and 120d are shown for simplicity. System 103 includes power delivery support structure 111 and a dielectric material region 127. Region 127 is positioned on surface 111a' so it covers conductive regions 116 and 117 and insulative region 119 and operates as a non-conductive covering. One advantage of dielectric material region 127 is that it protects surface 111a' so it is less likely to come into contact with undesirable objects. Another advantage is it also provides an additional amount of support for device 112 and protects surface 111a' from wearing down. The electrical power delivery for an embodiment with a dielectric layer 127 is accomplished via capacitive coupling. The geometry for the device contacts 120 and electrical power delivery surface pads 114, 118 of the conductive coupling are nearly identical to the geometry requirements for a direct electrically conductive connection. For a conductive coupling embodiment, some of the surface pads are maintained at one polarity while the remaining surface pads are maintained at a second polarity. As with the electrically conductive connection it is desired that at least one contact 120 be over a pad 114, 118 at one polarity while a second contact is simultaneously over a pad 114, 118 at the second polarity. However, for capacitive coupling a contact 120 may simultaneously overlap two surface pads 114, 118 at different polarities to a small degree without adverse consequences.

In operation, electronic device 112 is carried by power delivery support structure 111 on a surface 127a of region 127. Hence, contacts 120b and 120d engage surface 127a so they are separated from contact pads 114a and 118b, respectively, by region 127. In the positioning shown, there is a capacitance between contact 120b and contact pad 114a, as well as between contact 120d and contact pad 118a. In general, contacts 120 and conductive regions 116 and 117 are chosen so at least two capacitors are formed when contacts 120 engage surface 127a. Contacts 120 are arranged so these two capacitors are formed independently of angle φ.

Figure 7B:
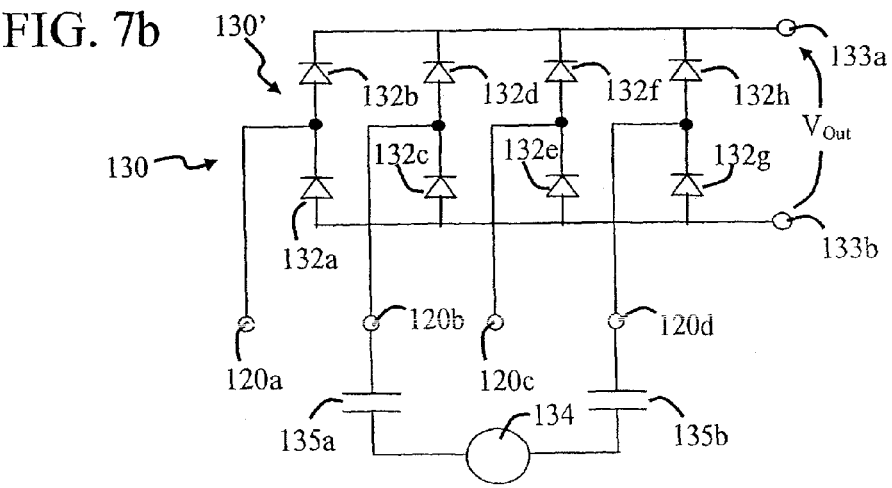

FIG. 7b is a schematic diagram of a circuit 130', in accordance with the invention, which includes the capacitances discussed above. Circuit 130' also includes circuit 130 as described with FIG. 4 and an AC power source 134 ($V_{inpp}$) coupled to contacts 120b and 120d through capacitors 135a and 135b, respectively. It should be noted, however, that power source 134 may be connected between other contacts in contacts 120 and the use of contacts 120b and 120d here is for illustrative purposes. Power source 134 represents the potential difference provided by the power delivery surface, so it is connected between the contacts in contacts 120 that have the potential difference between them.

Referring to FIG. 7a, capacitor 135a (C1) corresponds to contact 120b and contact pad 114a with the portions of dielectric material region 127 between them. Capacitor 135b (C2) corresponds to contact 120d and contact pad 118a with the portions of dielectric material region 127 between them. It should be noted that the capacitors 135a and 135b are connected in series. The impedance of capacitors 135a and 135b decreases as their capacitances increase. Conversely, the impedance of capacitors 135a and 135b increases as their capacitances decrease. Because source 134 provides an AC signal, it is desirable for capacitors 135a and 135b to have low impedances so they operate as low impedance current paths (i.e. short circuits) and more AC power can flow through region 127.

The capacitances of capacitors 135a and 135b depend on many different factors, such as thickness $t_1$ of region 127 and the type of dielectric material included therein. It is preferred that thickness $t_1$ be small and the dielectric material have a high dielectric constant ($\epsilon_r$) so the capacitances of capacitors 135a and 135b are large and their corresponding impedances are small. Examples of suitable dielectric materials include rubber, silicone, plastic, cloth, ceramic, etc.

Another factor which affects the capacitances of capacitors 135a and 135b is the dimensions D of contacts 120 and the dimensions W of contact pads 114 and 118. The capacitances generally increase as these dimensions increase. The amount of the capacitance of capacitor 135a also depends on the overlap between contact 120b and contact pad 114a and the amount of the capacitance of capacitor 135b also depends on the overlap between contact 120d and contact pad 118a. Hence, the amount of capacitance of capacitors 135a and 135b depends on angle φ. The capacitance of capacitor 135a increases as the amount of overlap between contact 120b and contact pad 114a increases and decreases as the amount of overlap between contact 120b and contact pad 114a decreases. Further, the capacitance of capacitor 135b increases as the amount of overlap between contact 120d and contact pad 118a increases and decreases as the amount of overlap between contact 120d and contact pad 118a decreases.

It should be noted that there are values of G, W, D and S that result in at least as much capacitance as full overlap for all angles φ over surface 111a. Dimension G can be adjusted so that one contact is over gap 119. In this way, there will always be one contact's worth of capacitance. As dimension G is increased, dimension D can also be increased so that the current carrying capability of contacts 120 is increased.

Circuit 130' shown in FIG. 7b may be analyzed based on the electrical properties of the circuit elements. The pertinent circuit elements include: Q (charge), $\epsilon_r$ (relative dielectric constant), $\epsilon_0$ (vacuum permittivity), $t_1$ (dialectric thickness), $V_{inpp}$ (AC Power Source 134), $V_{out}$ (voltage measured between 133a and 133b), C1 (capacitance of capacitor 135a), and C2 (capacitance of capacitor 135b). Other important variables include area of the contact that comes into contact with the power delivery source (A) and the diameter of the contact face (D). For a system with 100% contact probability, the geometry ensures that the electrical device contact's overlap area that forms the plate of one of the capactiors is not less than the area of the device contact due to the overlapping area of a single device contact. Therefore, it can be assumed that C1=C2=capacitance. Since C1 and C2 are connected in series, the equivalent capacitance ($C_{eq}$) is one half of C1, as follows:

$$C_{eq} = \frac{1}{2}C1$$

The charge (Q) per cycle that is transferred from the AC power source to the output $V_{out}$ is given by:

$$Q = 2(V_{inpp} - V_{out})C_{eq}$$

The area of a contact that may come into contact with the power delivery source is given by:

$$A = \frac{1}{4}\pi D^2$$

The capacitance of a contact with Area A defined above is given by:

$$C = \frac{\epsilon_0 \epsilon_r A}{t_1}$$

so $$C_{eq} = \frac{\epsilon_0 \epsilon_r A}{2t_1}$$

Therefore, where the excitation frequency is f, the current (I) may be written:

$$I = 2(V_{inpp} - V_{out})C_{eq}f$$

$$= 2(V_{inpp} - V_{out})\frac{\varepsilon_0 \varepsilon_r A}{2t_1}f$$

$$= (V_{inpp} - V_{out})\frac{\varepsilon_0 \varepsilon_r \pi D^2}{4t_1}f$$

For example, for a grid spacing of 19 mm and a contact diameter (D) of 3.8 mm, a relative dielectric constant ($\varepsilon_r$) of 11, and insulator barrier thickness ($t_1$) of 0.2 mm, a $V_{out}$ of 5V, a $V_{inpp}$ of 200V, and an excitation frequency of 1 MHz the Power supplied would be:

$$\text{Power} = V_{out} * I$$

$$= 5 * (200 - 5) * \frac{8.85 \times 10^{-12} * 11 * (0.0038)^2}{4 * 0.0002} * 1 \times 10^6$$

$$= 5.382 \text{ mW}$$

Figure 8A:
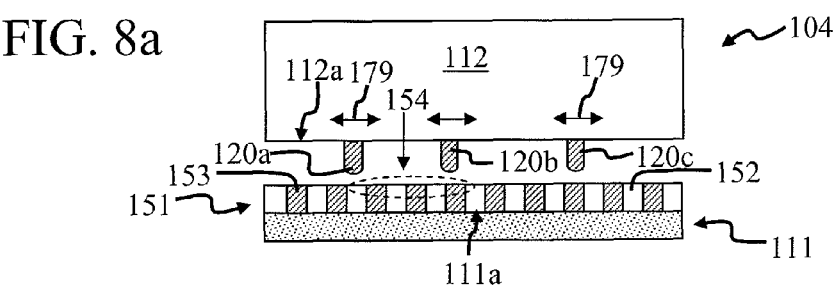
FIGS. 8a and 8b are side views of an electronic system having a covering with openings extending through it.
Figure 8B:
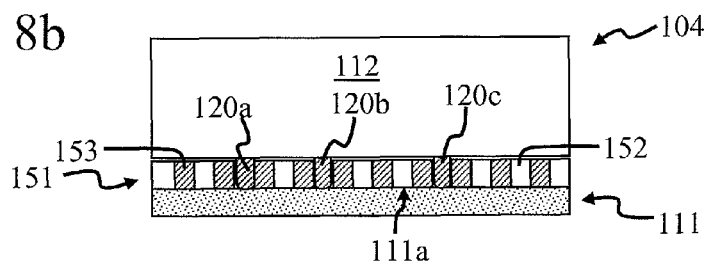

FIGS. 8*a* and 8*b* are side views of a power delivery system 104 with electronic device 112 in disengaged and engaged positions, respectively, relative to surface 111*a*. System 104 can include power delivery systems 100, 101 and 102. In this embodiment, power delivery system 104 includes a protective covering 151 carried by power delivery support structure 111, as shown in a perspective view in FIG. 8*c*. Covering 151 can include the same or a similar dielectric material as region 127 discussed above. It can also be rigid or flexible, and can include a pattern or coloring so it blends in with its surroundings or for other aesthetic reasons.

Figure 8C:
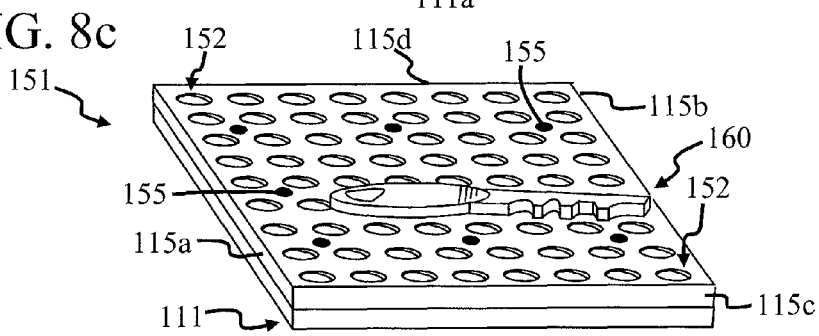
FIG. 8c is a perspective view of the covering of FIGS. 8a and 8b.

In accordance with the invention, covering 151 allows contacts 120 to extend through it to engage surface 111*a*, as described above. It also prevents the engagement between surface 111*a* and an undesirable object, such as a key 160 (FIG. 8*c*). In this way, an undesirable short circuit is not formed between key 160 and surface 111*a*. Hence, covering 151 protects surface 111*a* while still allowing contacts 120 to engage it.

Figure 8D:
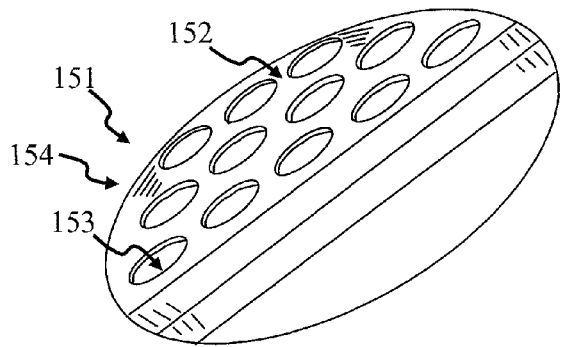
FIG. 8d is a more detailed perspective view of the covering of FIG. 8d.

In this embodiment, covering 151 includes a plurality of openings 153, as best seen in a perspective view of covering 151 in FIG. 8*d*. The portion of covering 151 shown in FIG. 8*d* corresponds to a region 154 shown in FIG. 8*a*. Openings 153 are spaced apart from each other by a dielectric material portion 152 and allow contacts 120 to extend through covering 151. Openings 153 are sized, shaped and spaced apart from each other so contacts 120 can extend through them and engage surface 111*a*. In this way, covering 151 allows surface 111*a* to provide a potential difference to electronic device 112 through contacts 120 while reducing the likelihood of a short circuit being formed between regions 116 and 117. Covering 151 also acts to reduce the movement of electronic device 112 along surface 111*a*. The movement is reduced because contacts 120 extend through openings 153, which restricts the movement of device 112 along surface 111*a* because the contacts will engage material portion 152.

Contacts 120 are arranged so they can be aligned with corresponding openings 153 and extend through them to engage surface 111*a* (FIG. 8*b*). In other examples, contacts 120 are moveable so the distance between them can change. In this way, contacts 120 can adjust their positioning relative to each other so they are better aligned with openings 153.

Figure 8E:
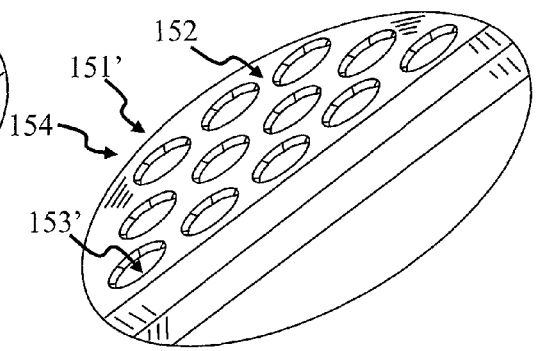
FIG. 8e is a more detailed perspective view of the covering of FIG. 8d having tapered openings.

An example of this is shown in FIG. 8*e*, which is a perspective view of a covering 151'. In accordance with the invention, covering 151' includes openings 153' which are tapered inwardly toward surface 111*a*. When contacts 120 engage the tapered portion of openings 153', contacts 120 move as indicated by movement arrow 179 (FIG. 8*a*), so they are better aligned with them. In this way, contacts 120 can align themselves with openings 153' when they engage covering 151'. It should be noted that contacts 120 can move in many different ways, some of which are discussed with FIGS. 19*a*-19*f* and 20*a*-20*f*.

In some examples, covering 151 is removably attached to power delivery support structure 111 in a repeatable manner. In other examples, covering 151 is freely positioned on surface 111*a* so it is removable from it. A removable covering is desirable in situations where a beverage, such as water or soda, has been spilled on surface 111*a*. A removable covering allows easier cleaning and maintenance of both the covering and surface 111*a*. Further, a removable covering allows it to be replaced with another one for aesthetic reasons. One example of a removable covering is a woven material, such as cloth. A removable cloth covering is easy and convenient to clean because it can be removed from surface 111*a* for this purpose.

Covering 151 can be removably attached to structure 111 in many different ways. In FIG. 8*c*, covering 151 is attached to surface 111*a* with fasteners 155 which hold it to structure 111. Fasteners 155 can be of many different types, such as screws. In other examples, covering 151 can be attached to surface 111*a* with bolts, clamps, etc. The attachment points can be proximate to any one of sides 115*a*, 115*b*, 115*c* and/or 115*d* or they can be somewhere in between, as shown in FIG. 8*c*.

In other examples, covering 151 is integrated with power delivery support structure 111. This can be done in many different ways. For example, covering 151 can be glued to structure 111 or it can be printed, silk-screened or otherwise deposited onto surface 111*a*. When using these deposition methods, covering 151 generally includes a dielectric material, such as paint, silicone or epoxy.

Figure 9A:
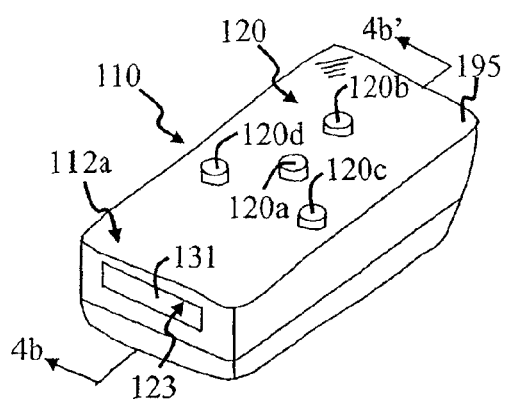
FIGS. 9a and 9b are perspective and side views, respectively, of an electronic device embodied as a cell phone, in accordance with the invention.
Figure 9B:
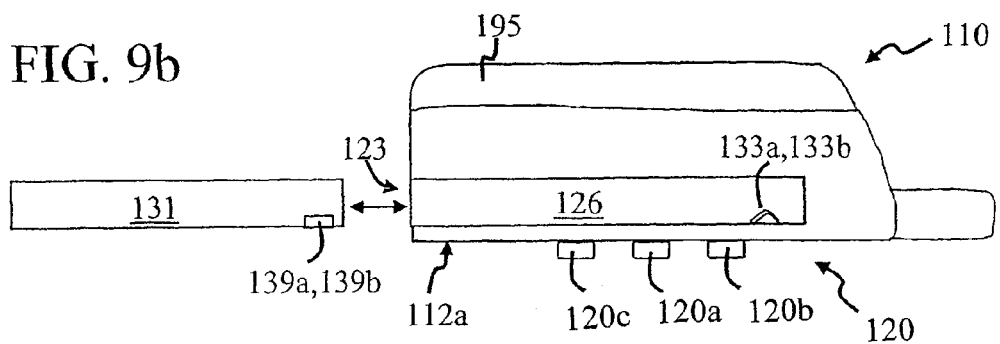

FIGS. 9*a* and 9*b* are perspective and side views, respectively, of an electronic device embodied as a cell phone 110, in accordance with the invention. In this embodiment, cell phone 110 includes a housing 195 having an opening 123 extending through it and into a battery compartment 126. Battery compartment 126 houses power system 131, which is a rechargeable battery in this example. Power system 131 can be repeatably inserted into and removed from battery compartment 126, as shown in FIGS. 9*a* and 9*b*, respectively. When power system 131 is inserted into compartment 126, its contacts 139*a* and 139*b* engage contacts 133*a* and 133*b*, respectively, of circuit 130 (FIGS. 3 and 4) so signals can flow between them.

Cell phone 110 also includes contacts 120 which extend through housing 195. In this example, housing 195 is spaced apart from the power delivery surface by contacts 120 when device 112 is carried by power delivery support structure 111. Contacts 120 include four contacts, as discussed above, denoted as contacts 120*a*, 120*b*, 120*c* and 120*d*. It should be noted that in other examples, another number of contacts can be included, such as five or six, and they can be arranged in many different ways. Some of these examples are discussed in FIGS. 10*a* and 10*b*. The number and particular arrangement of the contacts depends on many different factors, such as the arrangement of conductive regions 116 and 117 (FIGS. 2, 3, and 6).

In accordance with the invention, housing 195 of device 112 has been modified so contacts 120 extend through housing 195 and outwardly from surface 112a. Surface 112a corresponds to an outer surface of housing 195. In this way, contacts 120 are carried by and integrated with device 112. In this example, cell phone 110 also includes and carries circuit 130 (FIGS. 4 and 9d), but it is not shown here in FIGS. 9a-c for simplicity. Circuit 130 is positioned within housing 195 in this embodiment, but it can be positioned outside of it in others. An example of circuit 130 being positioned outside of housing 195 is discussed with FIGS. 16a and 16b and an example of it being positioned within housing 195 will be discussed presently.

Figure 9C:
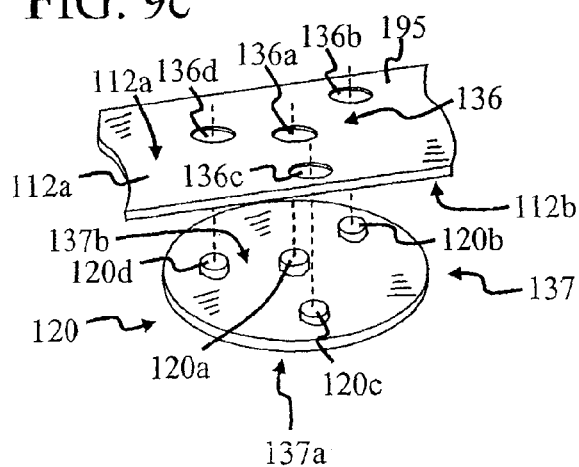
FIG. 9c is an exploded top perspective view of a contact power delivery support structure and housing included in the cell phone of FIGS. 9a and 9b.

FIG. 9c is an exploded top perspective view of housing 195 and contacts 120. In this example, housing 195 has been modified by forming openings 136a, 136b, 136c and 136d which extend through it between side 112a and an opposed side 112b. Openings 136a, 136b, 136c and 136d are sized and positioned to receive contacts 120a, 120b, 120c and 120d, respectively.

Figure 9D:
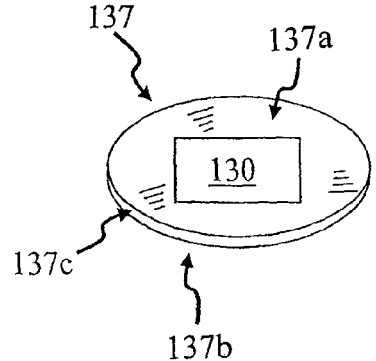
FIG. 9d is a bottom perspective view of the contact power delivery support structure of FIG. 9c showing it carrying the electronic circuit of FIG. 4.

In this embodiment, contacts 120a-120d are carried by a contact power delivery support structure 137 on its surface 137b. Power delivery support structure 137 can be attached to surface 112b so contacts 120a-120d extend through corresponding openings 136a-136d. It should be noted that the interface between contacts 120a-120d and corresponding openings 136a-136d is preferably hermetic to reduce the flow of moisture therebetween. In some examples, power delivery support structure 137 can also carry electronic circuit 130 so it is positioned within housing 195. Circuit 130 can be positioned at many different locations on structure 137. For example, FIG. 9d is a bottom perspective view of contact power delivery support structure 137 showing circuit 130 positioned on its opposed surface 137a. The conductive lines connecting circuit 130 to contacts 120 can be positioned in many different ways. For example, they can extend through power delivery support structure 137 or across its outer periphery 137c and between sides 137a and 137b, but the conductive lines are not shown here for simplicity.

FIG. 10a is a top view showing one arrangement of contacts 120, in accordance with the invention. In this example, contacts 120 are arranged so contact 120a is centered at a position 124 centrally located within an imaginary circle 125. Imaginary circle 125 has radius R and is included herein for reference purposes only to show the positioning of contacts 120 relative to each other and to position 124. Contacts 120b, 120c and 120d are positioned on imaginary circle 125 a distance of about R–(D/2) away from position 124 and spaced apart from each other. In this example, there are three contacts on circle 125 and they are equidistantly spaced from each other. Hence, there is an angle θ of about 120° between them relative to position 124. Angle θ between contacts 120b and 120d is shown in FIG. 10a. It should be noted that θ depends on the number of contacts positioned on circle 125, as discussed with FIGS. 10b and 10c. It should also be noted that contacts 120b, 120c and 120d can be positioned other distances, such as distance R, from position 124.

In this example, contacts 120 are cylindrical in shape, with each having a diameter D. Diameter D is chosen so it is smaller than the dimension G of insulative region 119 (FIGS. 5a and 5b). Radius R and diameter D are chosen so when contacts 120 engage surface 111a, at least one of them is engaged with conductive region 116 and at least another one of them is engaged with conductive region 117. In this way, there is a potential difference between at least two of the contacts in contacts 120 and power is provided to power system 131, as discussed above. The arrangement of contacts 120 is preferably used with the arrangement of conductive regions 116 and 117 as shown in FIG. 2.

Figure 10B:
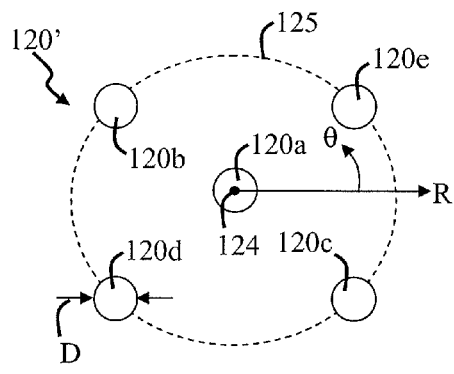
FIGS. 10b and 10c are top views showing other contact arrangements having five and six contacts, respectively.
Figure 10C:
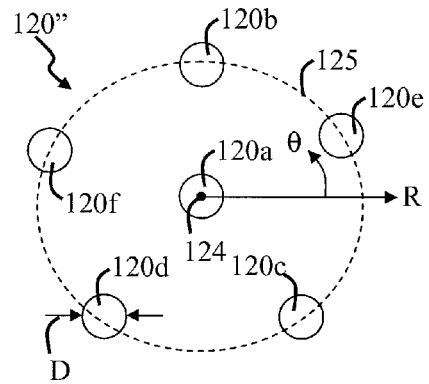

FIGS. 10b and 10c are other examples of an arrangement of contacts, denoted generally as contacts 120' and 120", respectively. Contacts 120' include five contacts and contacts 120" include six contacts. In FIG. 10b, there are four contacts, denoted as contacts 120b-120e, positioned on imaginary circle 125 and spaced about distance R–(D/2) from position 124 and equidistantly from each other. In FIG. 10c, there are five contacts, denoted as contacts 120b-120f, positioned on imaginary circle 125 and spaced apart from each other and spaced about distance R–(D/2) from position 124. In FIGS. 10b and 10c, the contacts on circle 125 are spaced equidistantly from each other so angle θ is about 90° and 72°, respectively. In this way, angle θ depends on the number of contacts positioned on circle 125. The arrangement of contacts 120' and 120" are preferably used with the arrangement of conductive regions 116 and 117 as shown in FIG. 6. It should be noted that contact 120a is shown as being centrally located within imaginary circle 125 in FIGS. 10a-10c for illustrative purposes and that it can be positioned on circle 125 in other examples.

FIGS. 10a-c represent three examples of embodiments of a contact arrangement that may be implemented. Other contact arrangements may be employed in various embodiments. Other contact arrangements may also permit 100% contact probability. For the contact arrangements shown in FIGS. 10a-c, 100% contact probability is likely achievable even when the placement of the individual contacts deviates from the exact desired location by up to the diameter of one contact.

Figure 11A:
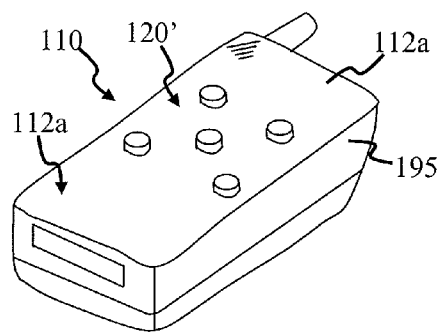
FIGS. 11a and 11b are perspective views of the contacts arrangements of FIGS. 10b and 10c, respectively, included with an electronic device embodied as a cell phone.
Figure 11B:
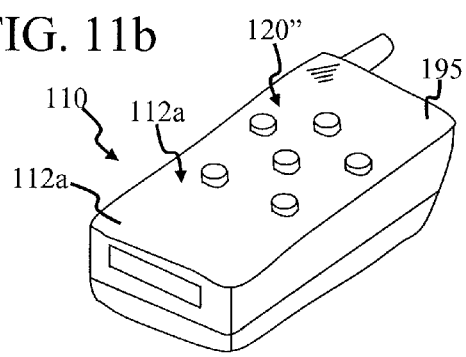

FIGS. 11a and 11b are perspective views of contacts 120' and 120", respectively, carried by and integrated with cell phone 110. Here, contacts 120 of cell phone 110 have been replaced with corresponding contacts 120' and 120". In these examples, housing 195 has been modified as taught with FIG. 9c so contacts 120' and 120" extend through housing 195 and outwardly from surface 112a. It is useful if the interface between contacts 120' and 120" and housing 195 is hermetically sealed to reduce the likelihood of moisture flowing into housing 195. It should be noted that the number of openings 136 depends on the number of contacts. Hence, in these examples, five and six openings are formed through housing 195 in FIGS. 11a and 11b, respectively. Contacts 120, 120' and 120" are shown as being cylindrical in shape. However, it should be noted that they can have other shapes, as will be discussed presently.

Figure 12A:
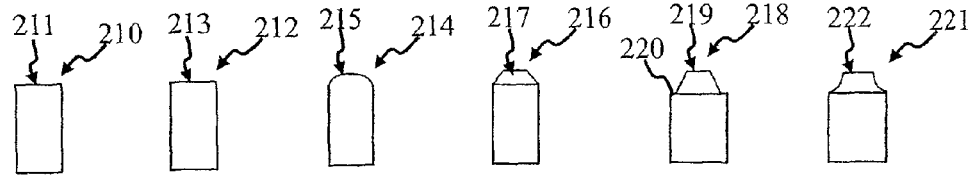
FIGS. 12a and 12b are side and perspective views, respectively, of embodiments of contacts having different shapes.
Figure 12B:
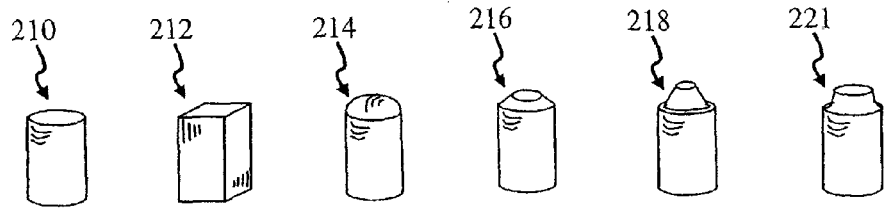

FIGS. 12a and 12b are side and perspective views, respectively, of embodiments of contacts having different shapes. The shapes can be chosen based on many different factors, such as the shape of the power delivery surface and the desired current flow between the power delivery surface and contacts. Power delivery surfaces with different shapes are discussed with FIG. 3. The current flow depends on the shape of the power delivery surface and the shape of the contacts because these factors affect the engagement area between the contacts and the power delivery surface and, consequently, the resistance between them.

In these examples, contacts 210 and 212 have round and rectangular ends 211 and 213, respectively, so contact 210 is cylindrical and contact 212 is cubic. Contacts 214, 216, 218 and 221 are cylindrical in shape. Contact 214 has a domed end 215 and contact 216 has a straight tapered end 217. Contact 218 has a straight tapered end 219 with a ridge 220 and contact 221 has a sloped curved tapered end 222. It should be noted that ends 211, 213, 215, 217, 219 and 222 engage the power delivery surface. It should also be noted that the shapes shown here are for illustrative purposes and that other contacts used with the invention can have other shapes.

There are several advantages provided by the cell phones shown in FIGS. 9a-9c and 11a-11b. One advantage is that contacts 120, 120' or 120" can be integrated with a cell phone during its manufacture. Another advantage is that the housing of an existing cell phone can be modified by forming openings 136 through the housing so contacts 120, 120' or 120" can be integrated with it. As will be discussed presently, a further advantage is that contacts 120, 120' or 120" can be integrated with a door or cover of a cell phone. This can be done during or after its manufacture. For example, an existing cell phone can be modified by removing its door or cover and modifying or replacing it with a door or cover that is already modified.

Figure 13A:
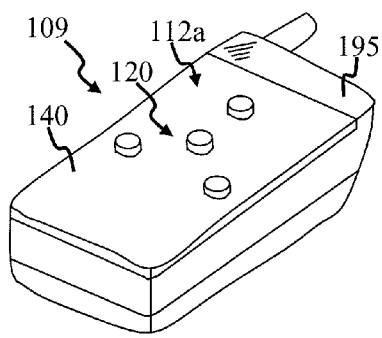
FIGS. 13a and 13b are perspective views of an electronic device embodied as a cell phone having a door in closed and open positions, respectively.
Figure 13B:
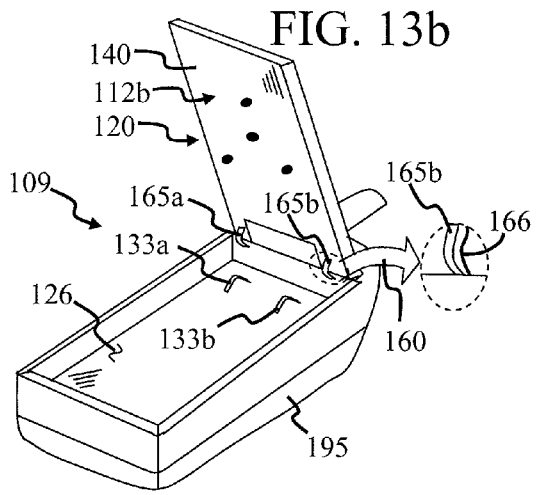

FIGS. 13a and 13b are perspective views of another embodiment of an electronic device, which is embodied as a cell phone 109 having a battery door 140. In accordance with the invention, door 140 includes and carries contacts 120 and electronic circuit 130 (not shown). Door 140 defines a portion of surface 112a and is coupled to housing 195 so it is repeatably moveable between closed (FIG. 13a) and open (FIG. 13b) positions relative to battery compartment 126. In this way, circuit 130 and contacts 120 move with door 140. Door 140 can be coupled to housing 195 in many different ways, but in this example they are coupled together using hinges 165a and 165b.

Contacts 120 are connected to contacts 133a and 133b as shown in FIG. 13b. In this example, contacts 120 are connected to contacts 133a and 133b through a conductive line. The conductive line can extend through many different portions of housing 195, but in this example, separate conductive lines extend adjacent to corresponding hinges 165a and 165b. An example is indicated by arrow 160, which shows a close-up view of hinge 165b. In this example, a conductive line 166 extends adjacent to hinge 165b and connects contacts 120 to contact 133b. In some examples, conductive line 166 can extend through hinge 165b and in other examples, conductive line 166 can be two lines coupled together with a connector to facilitate the removal of door 140. A charging circuit to manage the charging of the battery may be included between the contacts and the battery in order to preserve battery life and otherwise properly charge the battery.

An advantage of this embodiment is that contacts 120 can be easily integrated with door 140 during or after its manufacture. Door 140 can also be used to replace another door included in cell phone 109 that does not already include contacts 120 and/or circuit 130. Another advantage is that door 140 can be removed and replaced with a different door having the same or a different arrangement of contacts, such as contacts 120' and 120". Further, door 140 can be removed and replaced with a different door having a different electronic circuit 130.

Figure 13C:
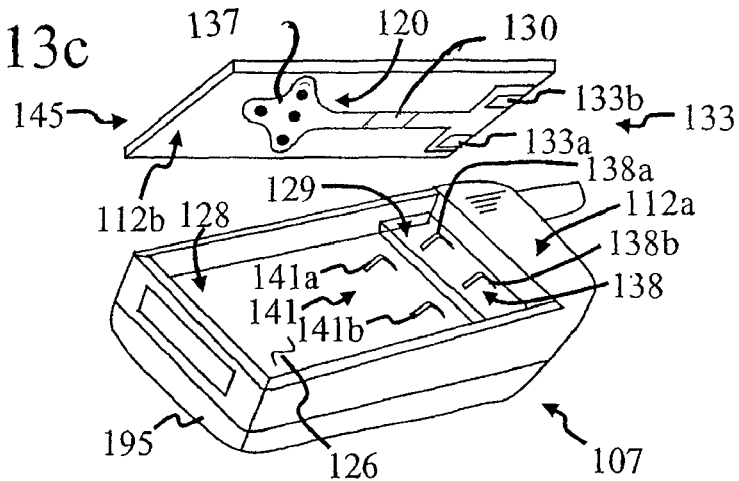
FIG. 13c is a perspective view of an electronic device embodied as a cell phone having a cover.
Figure 18A:
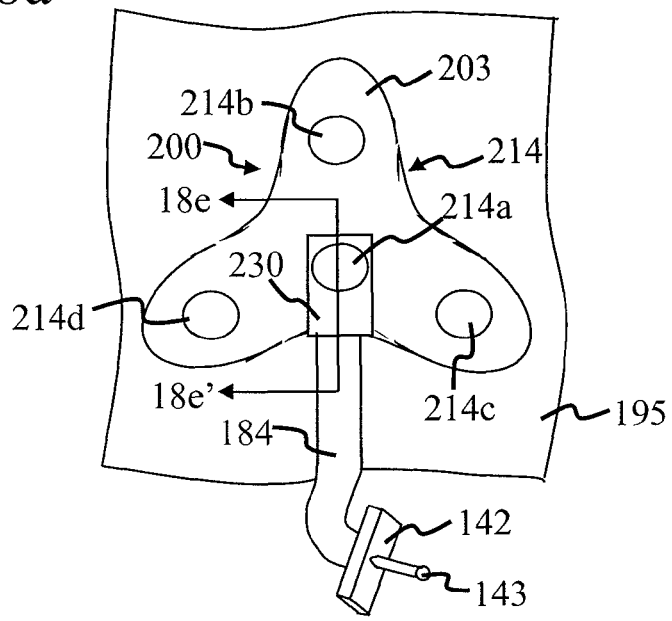
FIGS. 18a and 18b are top and perspective views, respectively, of another embodiment of a contact power delivery support structure.
Figure 18B:
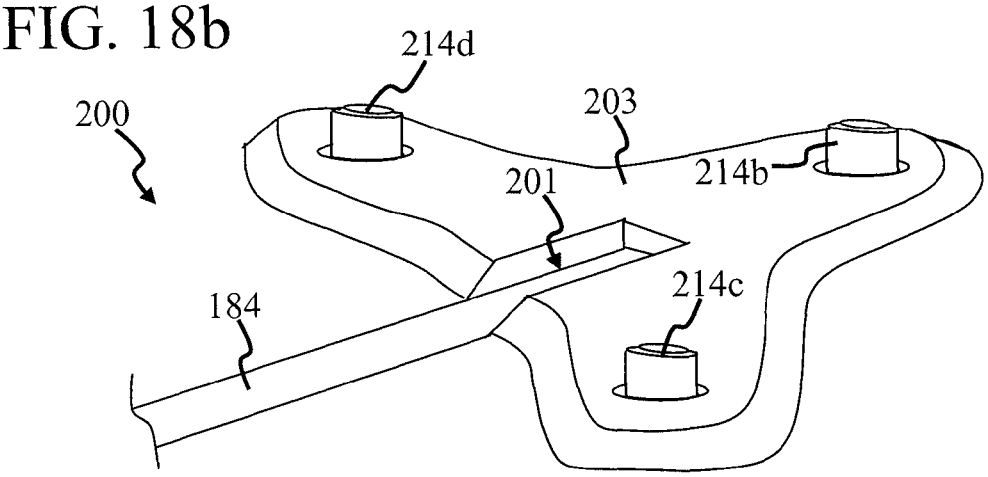

FIG. 13c is a perspective view of another embodiment of an electronic device, which is embodied as a cell phone 107 having a battery cover 145, in accordance with the invention. Cover 145 carries contacts 120 and 133 and contacts 120 are connected to contacts 133a and 133b as shown in FIG. 13c by conductive lines in a power delivery support structure 137 similar to that shown in FIGS. 9c and 9d, but shaped as shown in FIGS. 18a and 18b described below and can include the circuit 130 as shown in FIG. 9c. Cover 145 defines a portion of cell phone surface 112a and is repeatably moveable between open and closed positions relative to battery compartment 126. In this way, circuit 130, contacts 120 and contacts 133 move with door 140.

A power system, such as the rechargeable battery power system 131 of FIG. 9b, can be inserted into compartment 126 and positioned on bottom surface 128 so its contacts 139a and 139b (see FIG. 9b) engage contacts 141a and 141b, respectively, in FIG. 13c. Contacts 141a and 141b are positioned on bottom surface 128 and are generally denoted as contacts 141. Cell phone 107 also includes contacts 138a and 138b, denoted generally as contacts 138, positioned on an intermediate surface 129. Surface 129 is intermediate between surfaces 128 and 112a so contacts 138a and 138b engage contacts 133a and 133b, respectively, when cover 145 encloses compartment 126. Contacts 138a and 138b are in electrical communication with contacts 141a and 141b, respectively.

In operation, the potential difference provided to contacts 120 by the power delivery surface is rectified by circuit 130 in the power delivery support structure 137 so signal $V_{Power}$ is provided between contacts 133a and 133b. Since contacts 133a and 133b are engaged with corresponding contacts 138a and 138b when cover 145 encloses compartment 126, signal $V_{Power}$ is also provided between them and contacts 141a and 141b. Signal $V_{Power}$ is then provided to power system 131 (See FIG. 9b) through contacts 139a and 139b of the power system 131 since they engage corresponding contacts 141a and 141b when the power system 131 is positioned in the compartment 126 as explained above. Cell phone 107 provides the same or similar advantages provided by cell phone 109 discussed above.

Figure 14A:
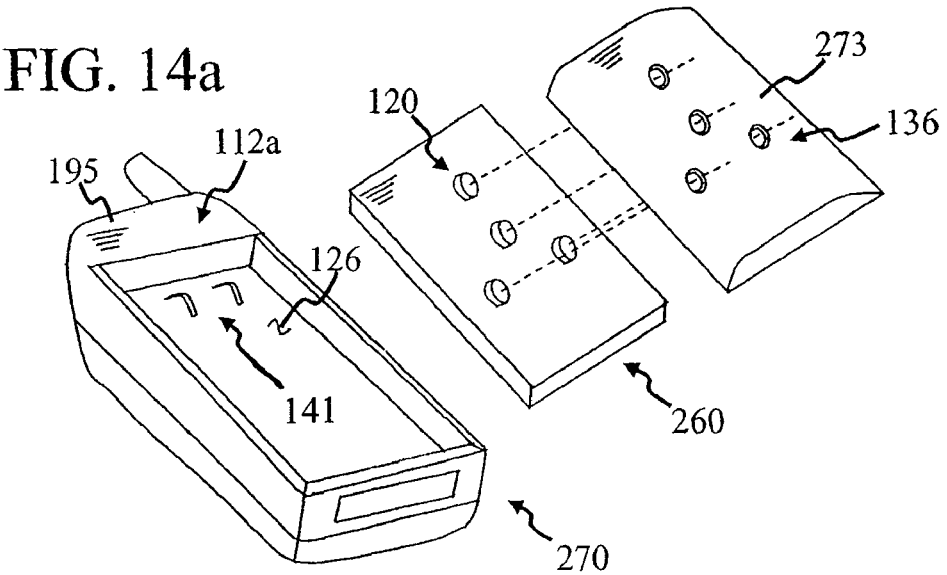
FIGS. 14a and 14b are perspective views of different embodiments of electronic devices embodied as cell phones having contacts integrated with a power system embodied as a battery.
Figure 14B:
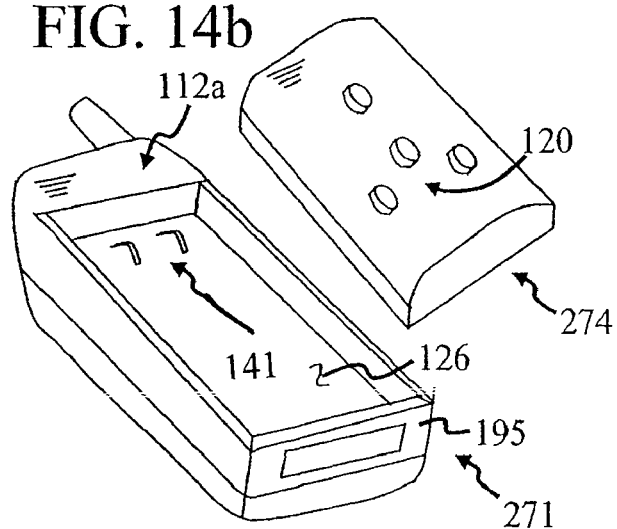

FIGS. 14a and 14b are perspective views of different embodiments of electronic devices, which are embodied as cell phones 270 and 271, respectively. Cell phone 270 includes battery 260 which fits into battery compartment 126 and a cover 273 which encloses compartment 126. In accordance with the invention, contacts 120 are carried by and integrated with battery 260. Contacts 120 can be integrated with battery 260 in many different ways, some of which are discussed with FIGS. 15a-15f. In this example, battery 260 and cover 273 are separate pieces and cover 273 includes openings 136 so contacts 120 can extend through it.

In FIG. 14b, cell phone 271 is similar to phone 270. One difference, however, is that battery 260 and cover 273 are integrated together to from a single piece 274. In accordance with the invention, contacts 120 are carried by and integrated with piece 274. This can be done in a manner the same or similar to that in which contacts 120 are integrated with battery 260, as will be discussed presently.

Figure 15A:
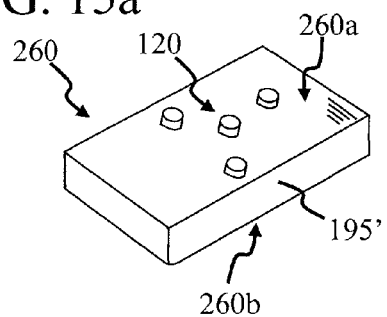
FIGS. 15a and 15b are top and bottom perspective views, respectively, of contacts integrated with the battery of FIGS. 14a and 14b.
Figure 15B:
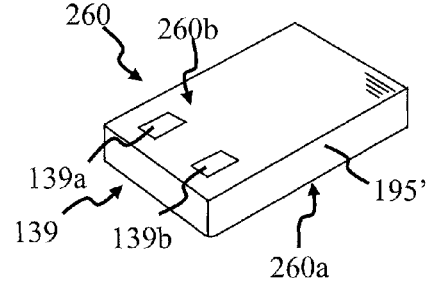

FIGS. 15a and 15b are top and bottom perspective views, respectively, of contacts 120 integrated with battery 260 another example implementation of the power system 131 shown in FIG. 9b. In this embodiment, battery 260 includes a casing 195' which encases power source 131. Contacts 120 extend through casing 195' and outwardly from top surface 260a of battery 260. Battery 260 also includes contacts 139 which extend through casing 195' and outwardly from bottom surface 260b of battery 260. In this way, contacts 120 and 139 are carried by and integrated with battery 260.

Figure 15C:
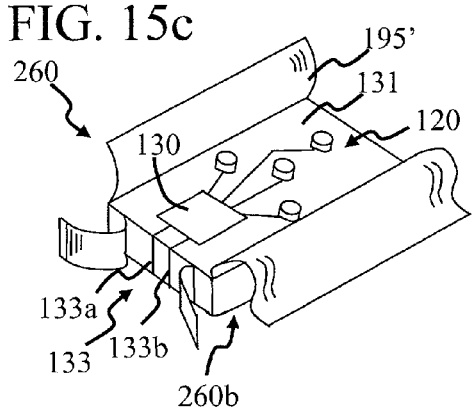
FIGS. 15c and 15d are top and bottom perspective views, respectively, of the battery of FIGS. 15a and 15b with its casing partially cut away.
Figure 15D:
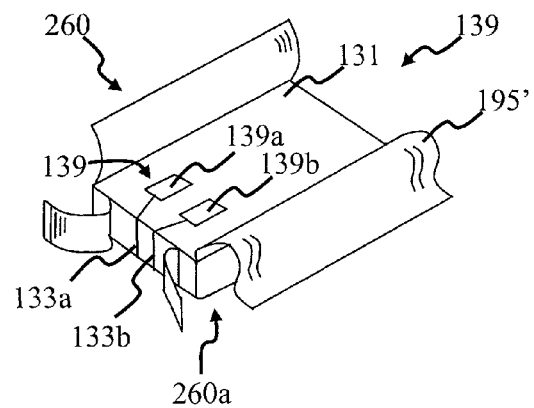

FIGS. 15c and 15d are top and bottom perspective views, respectively, of battery 260 with casing 195' partially unfolded to reveal components covered by the casing 195'. In this embodiment, circuit 130, along with contacts 120 and 139, is also carried by and integrated with battery 260. Circuit 130 is connected to contacts 120 and contacts 139 through conductive contacts 133.

Figure 15E:
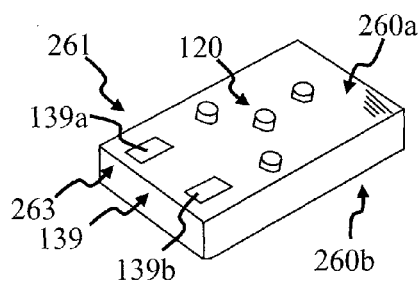
FIGS. 15e and 15f are top perspective views of other embodiments of contacts integrated with a power system embodied as a battery.
Figure 15F:
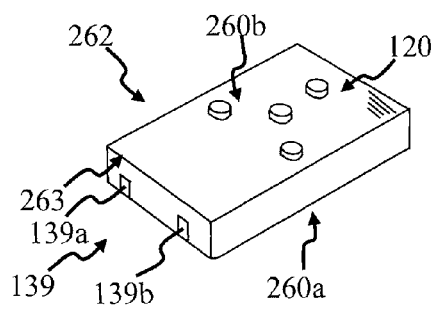

FIGS. 15e and 15f are top perspective views of other embodiments of batteries, denoted as batteries 261 and 262, respectively. In FIG. 15e, contacts 120 and 139 are both on side 260a, with contacts 139 being near an end 263 which extends between sides 260a and 260b. In FIG. 15f, contacts 139 are on side 260b and contacts 139 are on end 263 near side 260a. Hence, contacts 120 and 139 can be positioned at many different locations when integrated with a battery.

Figure 16A:
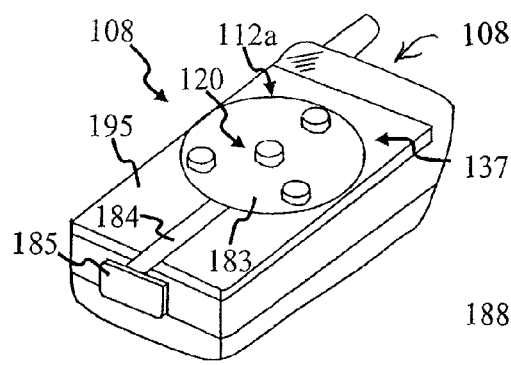
FIGS. 16a and 16b are perspective views of an electronic device embodied as a cell phone having a contact power delivery support structure attached to its housing, in accordance with the invention.
Figure 16B:
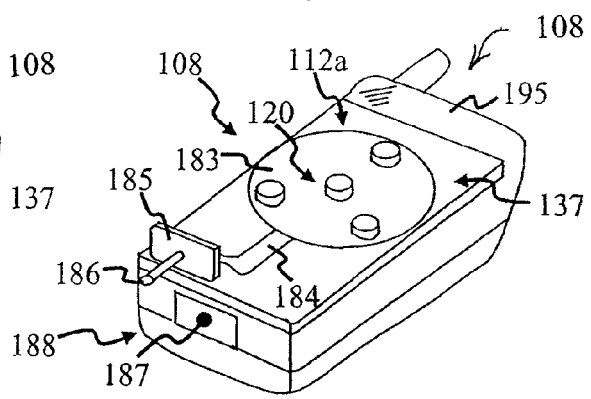

FIGS. 16a and 16b are perspective views of another embodiment of an electronic device, which is embodied as a cell phone 108. Cell phone 108 includes contact power delivery support structure 137 attached to housing 195 on surface 112a. In other examples, structure 137 can be attached to a cover or door, such as those shown in FIGS. 13a-13c. Power delivery support structure 137 can be attached to housing 195 in many different ways, such as by using an adhesive, such as glue. In other examples, housing 195 and structure 137 are integrated together in a single piece.

Power delivery support structure 137 includes a base 183 (FIGS. 16a and 16b) which carries contacts 120 and circuit 130 (FIGS. 9d and 17b) so they are positioned outside of housing 195. Contacts 120 are in communication with a cable 184 through circuit 130. Cable 184 is in communication with a male connector 186 carried by a battery connector 185. In this way, signals can flow between male connector 186 and contacts 120. Male connector 186 is sized and shaped to be received by an opening 187 included in a battery power receptacle 188. Battery power receptacle 188 extends through housing 195 and is in communication with power system 131 described above (not visible in FIGS. 16a and 16b). Battery connector 185 is shown in engaged and disengaged positions in FIGS. 16a and FIG. 16b, respectively, relative to battery power receptacle 188. When connector 185 is received by receptacle 188, signals can flow between contacts 120 and power system 131.

Figure 17A:
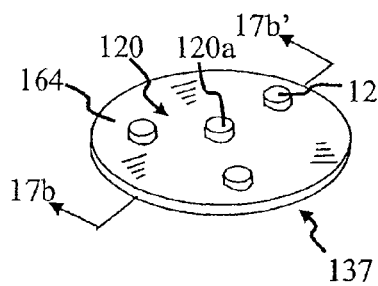
FIG. 17a is a perspective view of the contact power delivery support structure of FIGS. 16a and 16b.
Figure 17B:
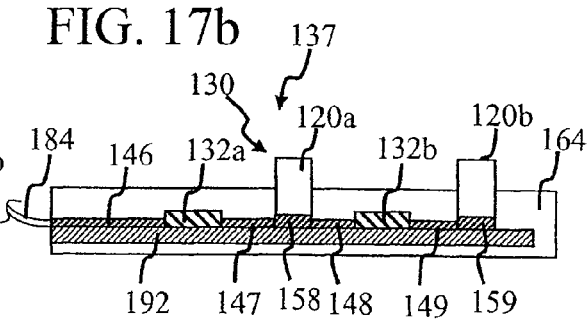
FIG. 17b is a cut-away side view of the contact power delivery support structure of FIG. 17a taken along a cut-line 17b-17b'.

FIG. 17a is a perspective view of contact power delivery support structure 137 and FIG. 17b is a cut-away side view of contact power delivery support structure 137 taken along a cut-line 17b-17b' of FIG. 17a. Structure 137 includes circuit board 192 which carries contacts 120a and 120b on contact pads 158 and 159, respectively. It should be noted that contacts 120c and 120d are also carried by corresponding contact pads, but they are not shown in this view. Circuit board 192 can be of many different types, but is preferably a flexible circuit board, such as those made by Rogers Corporation. These flexible circuit boards generally include laminates, coverfilm and bondplys.

Diode 132b is connected to contact pads 158 and 159 through interconnects 148 and 149, respectively. Diode 132a is connected to cable 184 and contact pad 158 through interconnects 146 and 147, respectively. In this example, circuit 130 is encapsulated by base 164 and contacts 120 are partially encapsulated. In this way, contacts 120 and circuit 130 are integrated with and carried by power delivery support structure 137.

Figure 17C:
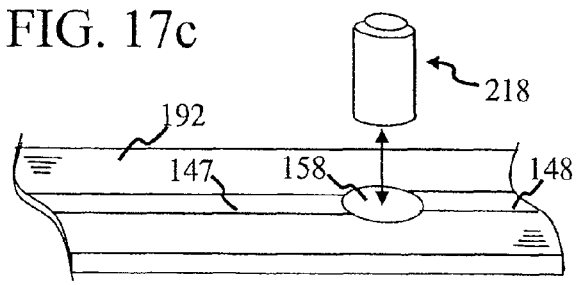
FIG. 17c is a more detailed perspective view of the circuit board included in the contact power delivery support structure of FIG. 17b.

FIG. 17c is a more detailed perspective view of circuit board 192. Interconnects 147 and 148 are carried on the surface of board 192, along with contact pad 158. In FIG. 17c, contact 120a, embodied as contact 218 (FIGS. 12a and 12b), is shown in a disengaged position relative to contact pad 158. Contact 218 is moveable to an engaged position where it is attached to pad 158, as indicated by the movement arrow. Contact 218 can be attached to pad 158 in many different ways, such as with soldering, so they are electrically connected together. It should be noted that the other contacts are generally connected to corresponding contact pads in the same or a similar manner.

Figure 17D:
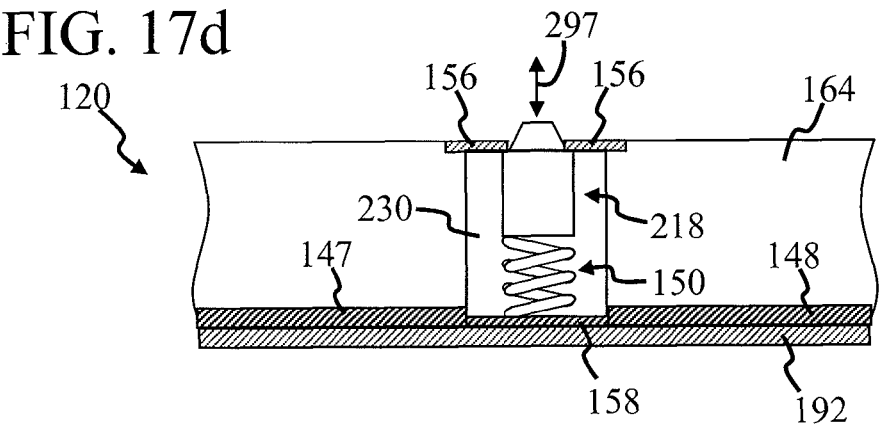
FIG. 17d is a side view of another embodiment of the contact power delivery support structure of FIG. 17a taken along cut-line 17b-17b'.

FIG. 17d is a cut-away side view taken along cut-line 17b-17b' of FIG. 17a of another embodiment of a contact power delivery support structure, which is denoted as contact power delivery support structure 137'. Power delivery support structure 137' includes an opening 230 which extends through base 164 and a resilient spring 150 carried on contact pad 158. Contact 218 is carried on spring 150 and extends upwardly towards a ring 156. Spring 150 can be conductive to facilitate the flow of signals between contact 218 and contact pad 158. It should be noted that spring 150 can be replaced with another resilient structure, such as a plug. Ring 156 is attached to base 164 and has a central opening through which straight tapered end 219 of contact 218 extends. Ring 156 also engages ridge 220 (FIG. 12a) so contact 218 is held between pad 158 and ring 156 by spring 150. In this way, contact 218 can move towards and away from pad 158 in response to a force, as indicated by a movement arrow 297. Movement arrow 297 extends perpendicular to surface 112a.

FIGS. 18a and 18b are top and perspective views of another embodiment of a contact power delivery support structure 131 described above and shown in FIGS. 9c and 9d, which is denoted in FIGS. 18a and 18b as a contact power delivery support structure 200. In this example, structure 200 has a Y-shaped body 203 and carries contacts 214a, 214b, 214c and 214d, which are generally denoted as contacts 214. Contacts 214b, 214c and 214d are positioned on separate branches of structure 200 and contact 214a is centrally located equidistantly between them. Structure 200 also includes an opening 201 (FIG. 18b) which extends into body 203 and between the branches carrying contacts 214c and 214d. In accordance with the invention, contact 214a extends through opening 201 and is held by a holder 202 (FIG. 18e). Contact power delivery support structure 200 is carried by housing 195 and cable 184 extends along housing 195 through opening 201. Cable 184 connects contacts 214 to male connector 186 so signals can flow between them.

Figure 18C:
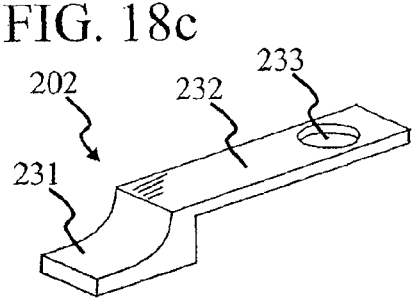
FIG. 18c is a perspective view of a holder for use with the contact power delivery support structure of FIGS. 18a and 18b.

FIG. 18c is a perspective view of holder 202. In this embodiment, holder 202 includes a base structure 231 which carries an arm 232 extending outwardly from it. Arm 232 includes an opening 233 positioned near its outer edge away from base structure 231. Opening 233 is sized and positioned so contact 214 can extend through it.

Figure 18D:
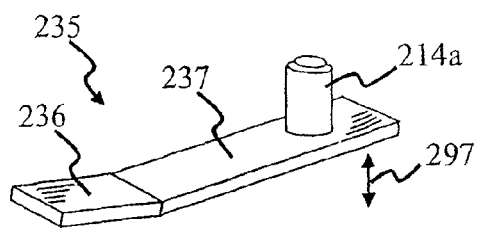
FIG. 18d is a perspective view of a flexible power delivery support structure included in the contact power delivery support structure of FIGS. 18a and 18b.
Figure 18E:
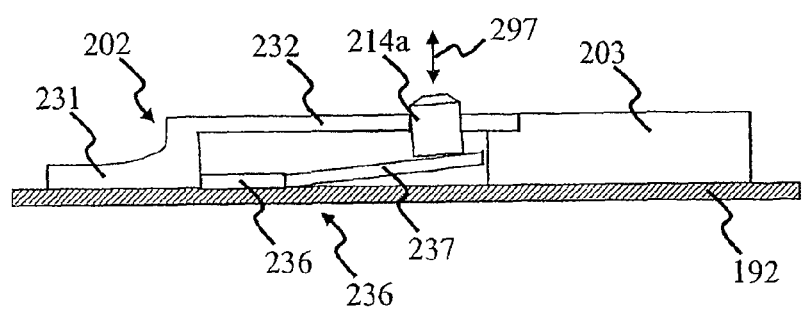
FIG. 18e is a side view of the contact power delivery support structure of FIG. 18a taken along a cut-line 18e-18e'.

FIG. 18d is a perspective view of a flexible power delivery support structure 235. In this embodiment, structure 235 includes a base structure 236 which carries an arm 237 extending outwardly and upwardly from it. Arm 237 carries contact 214a on its surface at a position away from base structure 236. Contact 214a is positioned on arm 237 so contact 214a extends through opening 233 when power delivery support structure 235 is positioned under arm 232, as discussed with FIG. 18e. Structure 235 is flexible so arm 237 can move relative to base structure 236, as indicated by movement arrow 297. In this way, contact 214a is also moveable.

FIG. 18e is a side view of holder 202 and flexible power delivery support structure 235 included with contact power delivery support structure 200 taken along a cut-line 18e-18e' as shown in FIG. 18a. In accordance with the invention, holder 202 is positioned so base structure 231 is attached to cable 184 and arm 232 extends towards body 203 and through opening 201. Flexible power delivery support structure 235 is positioned so base structure 236 is also attached to cable 184 and arm 237 extends towards body 203. Contact 214a is attached to arm 237 and positioned so it extends upwardly through opening 233. In this way, contact 214a is moveable relative to arm 232, as indicated by movement arrow 297. It should be noted that in some examples, contacts 214b, 214c and/or 214d can also move in directions indicated by movement arrow 297. This is also true for the other contacts discussed herein. It should further be noted that the contacts can move in a direction perpendicular to movement arrow 297, as will be discussed presently.

Figure 19A:
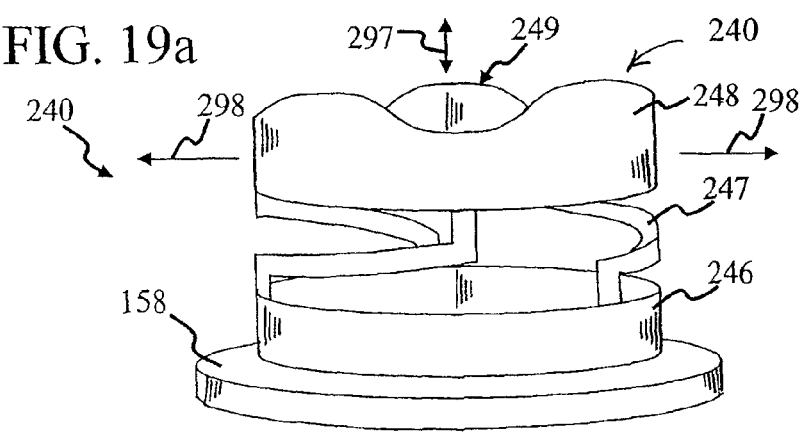
Figure 19E:
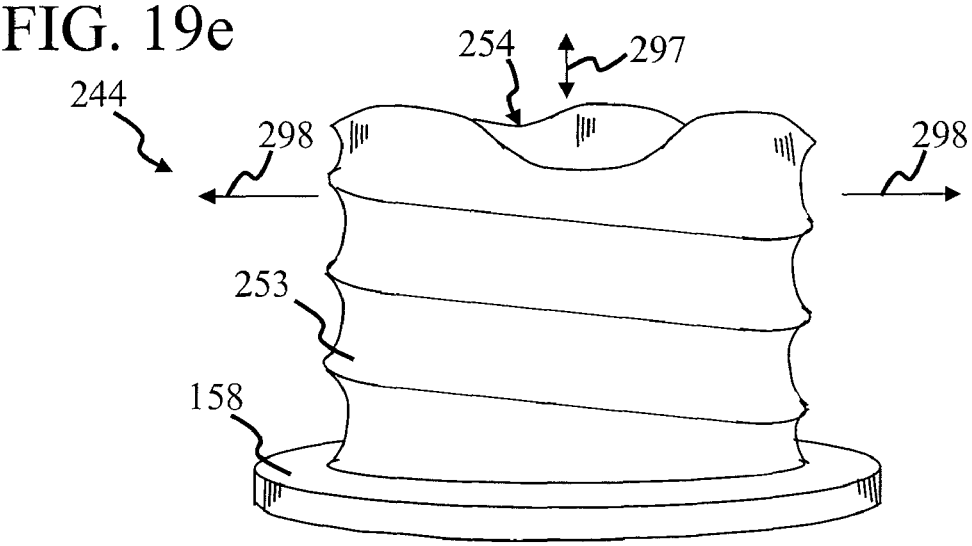

FIG. 19a is a perspective view of a contact 240, in accordance with the invention. Contact 240 includes a circular base structure 246 attached to contact pad 158. A resilient member 247 is attached to base structure 246 and, in this example, includes a plurality of resilient arms extending upwardly therefrom. Resilient member 247 carries a circular contact structure 248 which has an undulating upper edge. In accordance with the invention, the resilient arms operate as a spring so contact structure 248 can move as indicated by movement arrows 297 and 298. This feature increases the likelihood that contact 240 will engage the power delivery surface with a low enough contact resistance. This is desirable so signals can flow between them with less attenuation. Movement arrow 298 extends perpendicular to arrow 297.

FIGS. 19b, 19c, 19d and 19e are perspective views of contacts 241, 242, 243 and 244, respectively, in accordance with the invention. These contacts are similar to contact 240. Contact 241, however, includes a spring 247' attached to contact pad 158 so it extends upwardly therefrom. Spring 247' carries circular contact structure 248 having an upper undulating edge 249. Contact 242 is similar to contact 241 and includes spring 247' attached to contact pad 158 so it extends upwardly from it. In contact 242, spring 247' carries a circular base plate 250 having an undulating tubular contact structure 251 on its upper surface. Contact 243 is similar to contact 242 and includes spring 247' attached to contact pad 158 so it extends upwardly from it. In contact 243, however, spring 247' carries a circular ring 252 which carries undulating tubular contact structure 251. Contact 244 includes a resilient cylindrical spring 253 having an undulating upper edge 254. Spring 253 is attached to contact pad 158 so it extends upwardly from it. Contacts 241, 242, 243 and 244 can also move as indicated by movement arrows 297 and 298.

Figure 19F:
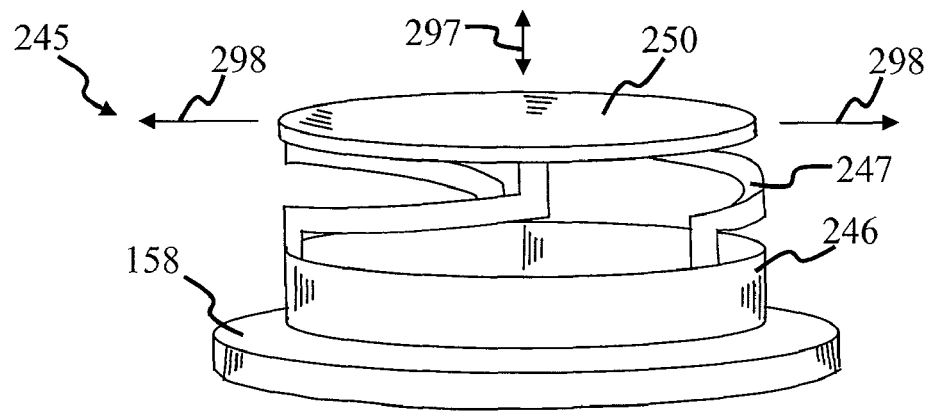

It should be noted that other contacts can be formed having various combinations of the features described with contacts 240-244. For example, FIG. 19f is a perspective view of a contact 245, in accordance with the invention. Contact 245 includes circular base structure 246 attached to contact pad 158. Resilient member 247 (FIG. 19a) is attached to base structure 246 and carries circular base plate 250 (FIG. 19c). Contact 245 can also move as indicated by movement arrows 297 and 298.

FIG. 20a is a side view of electronic device 112 with contacts 120 disengaged from surface 111a. In some situations, contacts 120 extend from surface 112a different distances so when some of contacts 120 engage surface 111a, they may not all make electrical contact with the power delivery surface as desired. As shown in FIG. 20a, contacts 120b and 120c extend to a reference line 190, but contact 120a does not. Contact 120d is not shown for simplicity. Reference line 190 is parallel to surfaces 111a and 112a. Hence, some of contacts 120 (i.e. contacts 120b and 120c) will engage surface 111a, but others (i.e. contact 120a) will not. Hence, contacts 120a, 120b and 120c will not all engage surface 111a unless they extend to reference line 190.

FIG. 20b is a side view of electronic device 112 with contact 120a engaged with surface 111a at a non-perpendicular angle relative to surface 111a and reference line 190. Since contact 120a is not perpendicular with surface 111a when they engage each other, the current flow between them is undesirably restricted because the contact area is decreased. Hence, signals flowing between contact 120a and surface 111a may be attenuated or corrosion may be accelerated.

FIG. 20c is a side view of a contact system 191, in accordance with the invention, which includes contact 120a. In this embodiment, contact 120a is cylindrical in shape, as shown in its perspective view in FIG. 20d, and has an opening 197 at one end which extends into it. Contact 120a, as shown in FIG. 20d, can be formed in many different ways, but here it is formed using a stamping process to form opening 197. Opening 197 is surrounded by a flange 196 which extends around its outer periphery. System 191 includes a resilient structure 194 which is shaped and dimensioned to be received by opening 197. Resilient structure 194 can be of many different types, such as a plug or spring.

System 191 also includes circuit board 192 which is coupled to housing 195 of electronic device 112 by arms 189. Circuit board 192 holds contact 120a between it and housing 195. In this embodiment, circuit board 192 includes a rigid material, but it can be flexible in other examples, as discussed with FIG. 20e. Housing 195 defines surface 112a which, in this embodiment, has opening 136a extending through it. Opening 136a is shaped and dimensioned to receive contact 120a so it extends outwardly from surface 112a, as discussed with FIG. 9c.

Arms 189 are chosen so contact 120a is loosely held within opening 136a and flange 196 is repeatably moveable between housing 195 and circuit board 192. Resilient structure 194 is positioned so it extends from contact pad 158 through opening 197 and to the portion of contact 120a away from circuit board 192. Resilient structure 194 allows contact 120a to move relative to surface 112a, as indicated by movement arrows 297 and 298. In this way, contact 120a can orientate itself when it engages surface 111a. This provides a better electrical connection between them. Resilient structure 194 can be conductive in some examples to facilitate the flow of signals between contact 120a and contact pad 158. Resilient structure 194 can be replaced with a spring in some examples, as discussed with FIG. 20e.

Figure 20E:
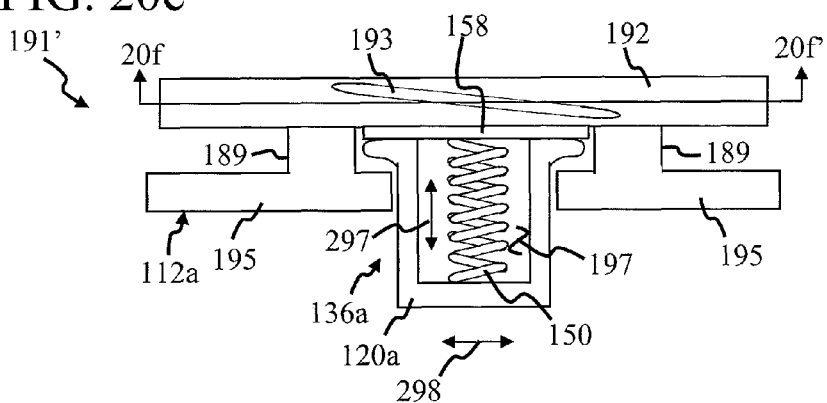
Figure 20F:
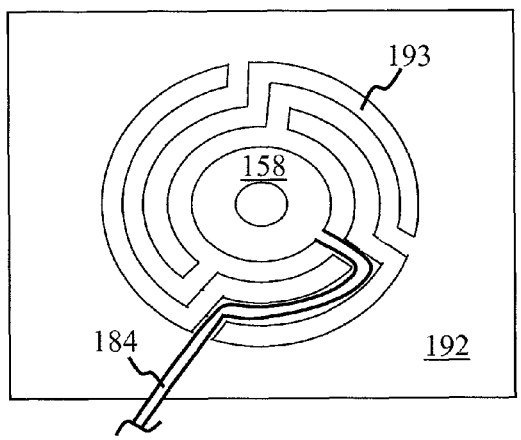
FIG. 20f is a top view of a circuit board, included in the contact system of FIG. 20e, taken along cut line 20f-20f'.
Figure 20D:
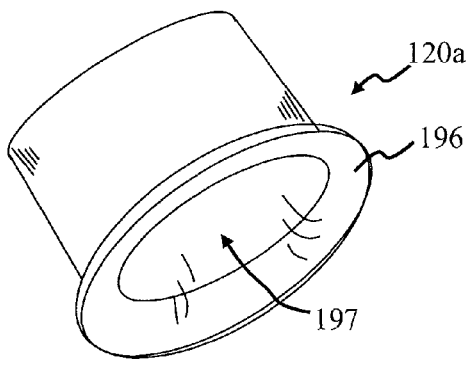
FIG. 20d is a bottom perspective view of a contact included in the contact system of FIG. 20c.

FIG. 20e is a side view of another embodiment of a contact system, denoted as a contact system 191', in accordance with the invention. As shown in a top view of circuit board 192 in FIG. 20f taken along a cut-line 20f-20f of FIG. 20e, circuit board 192 includes a circuit trace 193 connected to contact pad 158. Contact 120a is attached to contact pad 158 and pad 158 is connected to cable 184. In this example, structure 194 is replaced by resilient spring 150. Further, arms 189 are integrated with housing 195 and operate as retainers so circuit board 192 can move relative to them. In this way, circuit board 192 and contact 120a can move as indicated by movement arrows 297 and 298 when contact 120a engages surface 111a.

Since these and numerous other modifications and combinations of the above-described method and embodiments will readily occur to those skilled in the art, it is not desired to limit the invention to any of the exact construction and process shown and described above. While a number of example aspects and embodiments have been discussed above, those of skill in the art will recognize certain modifications, permutations, additions, and sub-combinations thereof. It is therefore intended that the following appended claims and claims hereafter introduced are interpreted to include all such modifications, permutations, additions, and sub-combinations as are within their true spirit and scope. The words "comprise," "comprises," "comprising," "has," "have," "having," "include," "including," and "includes" when used in this specification and in the following claims are intended to specify the presence of stated features or steps, but they do not preclude the presence or addition of one or more other features, steps, or groups thereof.

What is claimed is:

1. Power receiver apparatus for fitting onto an electrically powered device, which has a battery compartment equipped with battery power receiving contacts for receiving battery power from a battery positioned in the battery compartment and a plug receptacle for receiving electric power from an external source, to enable the electrically powered device to receive electric power from a recharging pad that has a flat power delivery surface comprised of a plurality of interdigitated flat, electrically conductive power delivery pads alternate ones of which are oppositely charged, comprising:

a battery cover with an inside surface and an outside surface formed to fit and attach onto the electrical device in a manner that covers the battery and closes the battery compartment with the inside surface juxtaposed to the battery and the outside surface forming an external surface of the electrically powered device;

a power delivery support structure mounted on the battery cover, wherein the power delivery support structure includes at least four electrically conductive contacts with proximal ends mounted on a circuit board to extend in spaced-apart relation to each other from the outside surface to respective distal ends that terminate in a common plane spaced apart from each other at distances set to enable at least two of the electrically conductive contacts to contact respectively oppositely charged ones of the power delivery pads when the electrically powered device is positioned on the flat power delivery surface, said circuit board also comprising a rectifier circuit connected electrically to the electrically conductive contacts and electric leads extending from the rectifier circuit for delivering power from the rectifier circuit to the electrically powered device, said circuit board, rectifier circuit, and proximal ends of the electrically conductive contacts being encapsulated for a hermetic seal.

2. The power receiver apparatus of claim 1, including electrically conductive contacts on the inside surface of the battery cover in a position to interface in electrically contacting relation with juxtaposed contacts in the battery compartment of the electrically powered device when the battery cover is fitted in place on the electrically powered device to cover the battery and close the battery compartment, and wherein the electric leads extending from the rectifier circuit extend to electrical connections with the electrically conductive contacts on the inside surface of the battery cover.

3. The power receiver apparatus of claim 1, including a plug extending from the battery cover that is sized and shaped for mechanical and electrical connection with the plug receptacle, and wherein the electric leads extending from the rectifier circuit extend to electrical connections with the plug.

4. The power receiver apparatus of claim 1, wherein the electrically conductive contacts include means for accommodating axial movement of the distal ends of the electrically conductive contacts toward the printed circuit board against a resilient bias to ensure that all of the distal ends are in contact with the flat power delivery surface when the electrically powered device is positioned on the flat power delivery surface with the outside surface of the battery cover juxtaposed to the flat power delivery surface.

5. The power receiver apparatus of claim 4, wherein the distal ends of the electrically conductive contacts have an undulating terminal edge.

* * * * *